United States Patent
Chen et al.

(10) Patent No.: US 11,829,057 B2
(45) Date of Patent: Nov. 28, 2023

(54) PROJECTION METHOD AND PROJECTION APPARATUS

(71) Applicant: Hisense Laser Display Co., Ltd, Qingdao (CN)

(72) Inventors: Xu Chen, Qingdao (CN); Jichen Xiao, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 66 days.

(21) Appl. No.: 17/556,345

(22) Filed: Dec. 20, 2021

(65) Prior Publication Data

US 2022/0113614 A1     Apr. 14, 2022

Related U.S. Application Data

(63) Continuation-in-part of application No. PCT/CN2020/087351, filed on Apr. 28, 2020.

(30) Foreign Application Priority Data

Jun. 20, 2019 (CN) .......................... 201910538309.9

(51) Int. Cl.
  *G03B 21/20* (2006.01)
  *G03B 21/14* (2006.01)

(52) U.S. Cl.
  CPC ....... *G03B 21/2033* (2013.01); *G03B 21/142* (2013.01); *G03B 21/2066* (2013.01)

(58) Field of Classification Search
  CPC .............. G03B 21/2033; G03B 21/142; G03B 21/2066; G03B 21/2086; H04N 9/31; H04N 9/3161; H04N 9/3155
  See application file for complete search history.

(56) References Cited

U.S. PATENT DOCUMENTS

| | | | |
|---|---|---|---|
| 2009/0073390 A1 | 3/2009 | Liu | |
| 2009/0122275 A1* | 5/2009 | Nagashima | H04N 9/3194 353/98 |

(Continued)

FOREIGN PATENT DOCUMENTS

| | | |
|---|---|---|
| CN | 101435975 A | 5/2009 |
| CN | 101517482 A | 8/2009 |

(Continued)

OTHER PUBLICATIONS

Office Action issued in corresponding Chinese Patent Application No. 201910538309.9 dated May 19, 2021, with English translation.

(Continued)

*Primary Examiner* — Magda Cruz
(74) *Attorney, Agent, or Firm* — Morgan, Lewis & Bockius LLP

(57) ABSTRACT

A projection apparatus includes a detector, a laser source control unit and a laser source unit, and the laser source control unit is connected to the detector and the laser source unit. The detector is configured to obtain a detection signal for indicating whether there is an object to be protected in a laser projection region, and send the detection signal. The laser source control unit is also configured to: receive the detection signal, and send an adjustment signal carrying an adjusted projection parameter to the laser source unit when it is determined that there is the object to be protected in the laser projection region of the laser source unit based on the detection signal. The projection parameter indicates a light emission luminance of at least one laser in the laser source unit. The laser source unit is configured to emit a beam in response to the adjustment signal.

18 Claims, 12 Drawing Sheets

(56) References Cited

U.S. PATENT DOCUMENTS

| | | | |
|---|---|---|---|
| 2009/0262314 A1* | 10/2009 | Nishigaki | G09G 3/025 353/98 |
| 2010/0073580 A1 | 3/2010 | Ritz | |
| 2010/0177929 A1 | 7/2010 | Kurtz et al. | |
| 2012/0218525 A1 | 8/2012 | Kwon et al. | |
| 2014/0036235 A1 | 2/2014 | Chang et al. | |
| 2014/0253884 A1* | 9/2014 | Kuki | G06F 3/0423 353/85 |
| 2014/0293231 A1* | 10/2014 | Yoon | G06F 3/0423 353/31 |
| 2015/0177601 A1* | 6/2015 | Imai | G03B 21/142 353/121 |
| 2015/0219500 A1 | 8/2015 | Maes | |
| 2015/0377467 A1* | 12/2015 | Chien | G03B 21/20 362/642 |
| 2018/0176522 A1 | 6/2018 | Chen et al. | |
| 2019/0354747 A1* | 11/2019 | Chi | G06V 10/25 |

FOREIGN PATENT DOCUMENTS

| | | |
|---|---|---|
| CN | 202067064 U | 12/2011 |
| CN | 102566220 A | 7/2012 |
| CN | 102681312 A | 9/2012 |
| CN | 202771144 U | 3/2013 |
| CN | 103576428 A | 2/2014 |
| CN | 203535368 U | 4/2014 |
| CN | 104601917 A | 5/2015 |
| CN | 104698727 A | 6/2015 |
| CN | 104954713 A | 9/2015 |
| CN | 105959659 A | 9/2016 |
| CN | 106507071 A | 3/2017 |
| CN | 106597789 A | 4/2017 |
| CN | 209283388 U | 8/2019 |
| JP | 2003-29204 A | 1/2003 |
| JP | 2012-181264 A | 9/2012 |
| KR | 10-2009-0023844 A | 3/2009 |
| WO | 2009/031094 A1 | 3/2009 |

OTHER PUBLICATIONS

Office Action issued in corresponding Chinese Patent Application No. 201910538309.9 dated Oct. 29, 2021, with English translation.
International Search Report and Written Opinion issued in corresponding International Application No. PCT/CN2020/087351 dated Jul. 29, 2020, with English translation.
Chinese Office Action dated May 9, 2023, issued in corresponding Chinese Patent Application No. 202210538656.3.

* cited by examiner

A1

A2

PROJECTION METHOD AND PROJECTION APPARATUS

CROSS-REFERENCE TO RELATED APPLICATIONS

This application is a Continuation-in-Part of International Patent Application No. PCT/CN2020/087351 filed on Apr. 28, 2020, which claims priority to Chinese Patent Application No. 201910538309.9 filed on Jun. 20, 2019, and the entirety is incorporated herein by reference.

TECHNICAL FIELD

The present disclosure relates to the field of laser projection technologies, and in particular, to a projection method and a projection apparatus.

BACKGROUND

With the development of laser technologies, a laser projection apparatus has been used widely. The laser projection apparatus includes a laser projector and a display screen. The laser projector may project laser beams to the display screen according to an image to be displayed, so as to display the image on the display screen.

SUMMARY

In an aspect, a projection apparatus is provided. The projection apparatus includes a detector, a laser source control unit, and a laser source unit. The laser source control unit is connected to the detector and the laser source unit. The detector is configured to obtain a detection signal for indicating whether there is an object to be protected in a laser projection region, and send the detection signal. The laser source control unit is configured to: receive the detection signal, and send an adjustment signal carrying an adjusted projection parameter to the laser source unit when it is determined that there is the object to be protected in the laser projection region of the laser source unit based on the detection signal. The projection parameter is used to indicate a light emission luminance of at least one laser in the laser source unit. The laser source unit is configured to emit a beam based on the adjustment signal.

In another aspect, a projection method is provided. The projection method includes: a detector obtains a detection signal for indicating whether there is an object to be protected in a laser projection region; the detector sends the detection signal to a laser source control unit; the laser source control unit receives the detection signal; the laser source control unit sends an adjustment signal carrying an adjusted projection parameter to the laser source unit when it is determined that there is the object to be protected in the laser projection region based on the detection signal, and the projection parameter being used to indicate a light emission luminance of at least one laser in the laser source unit; and the laser source unit emits a beam in response to the adjustment signal.

In yet another aspect, a non-transitory computer-readable storage medium is provided. The non-transitory computer-readable storage medium stores computer program instructions, and when executed by a projection apparatus, cause the projection apparatus to: obtain a detection signal for indicating whether there is an object to be protected in a laser projection region, and send an adjustment signal carrying an adjusted projection parameter to the laser source unit when it is determined that there is the object to be protected in the laser projection region based on the detection signal, so that the laser source unit emits a beam in response to the adjustment signal. The projection parameter is used to indicate a light emission luminance of at least one laser in the laser source unit.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals to which the embodiments of the present disclosure relate.

DETAILED DESCRIPTION

Figure 1A:
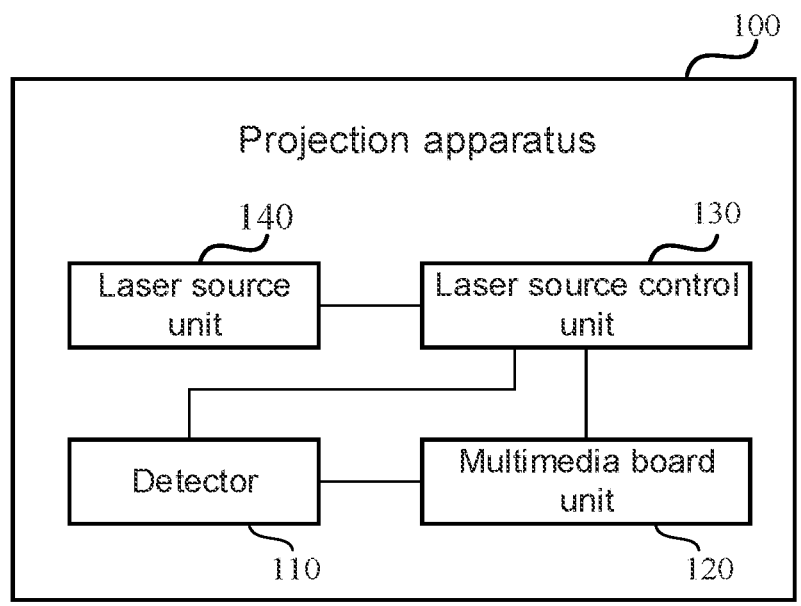
FIG. 1A is a block diagram of a projection apparatus, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics described herein may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a/the plurality of" means two or more unless otherwise specified.

In the description of some embodiments, the term "connected" and its extensions may be used. For example, the term "connected" may be used when describing some embodiments to indicate that two or more components are in direct physical contact or electrical contact with each other, or one or more intervening elements may also be present. However, the term "connected" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined" or "if [a stated condition or event] is detected" is optionally construed as "in a case where it is determined" or "in response to determining that" or "in a case where [the stated condition or event] is detected" or "in response to detecting [stated condition or event]", depending on the context.

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

A laser beam is a laser source with high energy. When the laser beam is irradiated to human eyes, it will cause great damage to the human eyes. Therefore, a laser projection apparatus usually has a human eye protection function to reduce the damage of the laser projection apparatus to the human eyes.

Figure 1B:
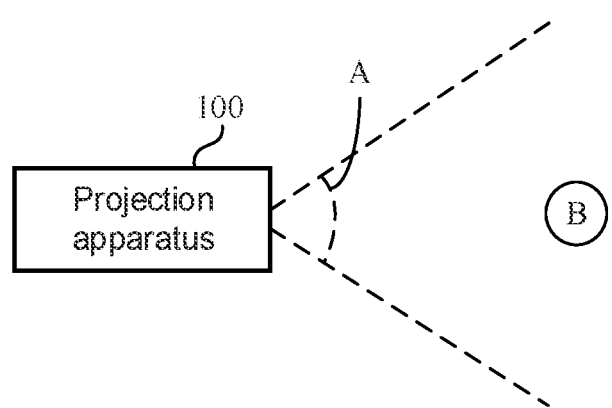
FIG. 1B is a top view of a projection apparatus, in accordance with some embodiments.

FIG. 1A is a block diagram of a projection apparatus in accordance with some embodiments, and FIG. 1B is a top view of a projection apparatus in accordance with some embodiments.

As shown in FIGS. 1A and 1B, the projection apparatus 100 includes a detector 110, a laser source control unit 130, a laser source unit 140 and a multimedia board unit 120. The detector 110 is connected to the laser source control unit 130 and the multimedia board unit 120. The laser source control unit 130 is also connected to the laser source unit 140 and the multimedia board unit 120.

The detector 110 is configured to obtain a detection signal for indicating whether there is an object B to be protected in a laser projection region A, and send the detection signal to the laser source control unit 130.

The laser source control unit 130 is configured to: receive the detection signal in a period after a power-on instruction is received and before the multimedia board unit 120 is started up, and send an adjustment signal carrying an adjusted projection parameter to the laser source unit 140 when it is determined that there is the object B to be protected in the laser projection region A of the laser source unit 140 based on the detection signal. The projection parameter is used to indicate a light emission luminance of at least one laser in the laser source unit 140. A unit of the luminance is, for example, lumen (lm). The object B to be protected may be a living body. For example, the object B to be protected is a person. The object B to be protected may also be other objects, such as a shield in front of the projection apparatus 100.

The laser source unit 140 is configured to emit a beam in response to the adjustment signal. For example, the laser source unit 140 reduces the light emission luminance of at least one laser therein in response to the adjustment signal.

In the projection apparatus 100 provided by some embodiments of the present disclosure, the laser source control unit 130 receives the detection signal in the period after the power-on instruction is received and before the multimedia board unit 120 is started up, and sends the adjustment signal carrying the adjusted projection parameter to the laser source unit 140 when it is determined that there is the object B to be protected in the laser projection region A of the laser source unit 140 based on the detection signal. Therefore, before the multimedia board unit 120 is started up, the laser source control unit 130 may instruct the laser source unit 140 to reduce the light emission luminance based on the adjusted projection parameter, so that the projection apparatus 100 may achieve the human eye protection function after the power-on instruction is received. Thus, a practicability of the projection apparatus 100 is improved.

Figure 2:
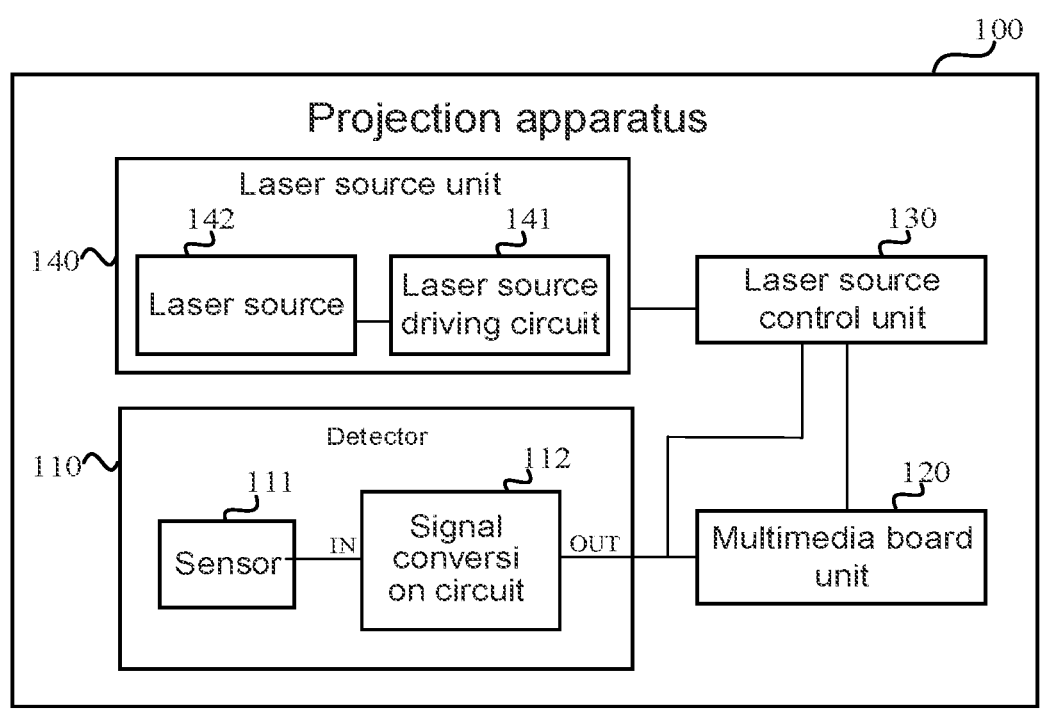
FIG. 2 is a block diagram of a projection apparatus, in accordance with some other embodiments.

In some embodiments, as shown in FIG. 2, the detector 110 includes a sensor 111 and a signal conversion circuit 112. The sensor 111 is configured to collect an infrared signal emitted by the object B to be protected, and send a sensing signal to the signal conversion circuit 112 based on the collected infrared signal. The sensing signal may be an electrical signal. For example, the sensor 111 is a pyroelectric infrared sensor. The sensor 111 is, for example, installed on an inner wall of a housing of the projection apparatus 100 and is proximate to a projection lens of the projection apparatus 100. A through hole is provided in a region of the housing of the projection apparatus 100 corresponding to the sensor 111, and the sensor 111 is exposed through the through hole.

The signal conversion circuit 112 may be independent of the sensor 111 or integrated in the sensor 111. For example, as shown in FIG. 2, the signal conversion circuit 112 is independent of the sensor 111, an input (IN) of the signal conversion circuit 112 is electrically connected to the sensor 111, and an output (OUT) of the signal conversion circuit 112 is electrically connected to the laser source control unit 130 and the multimedia board unit 120. The signal conversion circuit 112 is configured to send the detection signal to the laser source control unit 130 and the multimedia board unit 120 based on the sensing signal. The detection signal may be a pulse signal. In a case where the signal conversion circuit 112 is integrated in the sensor 111, the signal conversion circuit 112 may be connected to a circuit in the sensor 111 by referring to the above connection method, and the function of the signal conversion circuit 112 may be achieved by referring to the above description, which will not be repeated herein.

The sensing signal sent by the sensor 111 is usually in a millivolt (mv) level. Before the sensing signal is sent to the laser source control unit 130 and the multimedia board unit 120, the signal conversion circuit 112 may perform a series of operations on the sensing signal such as amplification to obtain the detection signal, so that the laser source control unit 130 and the multimedia board unit 120 may recognize and process the detection signal.

Figure 6:
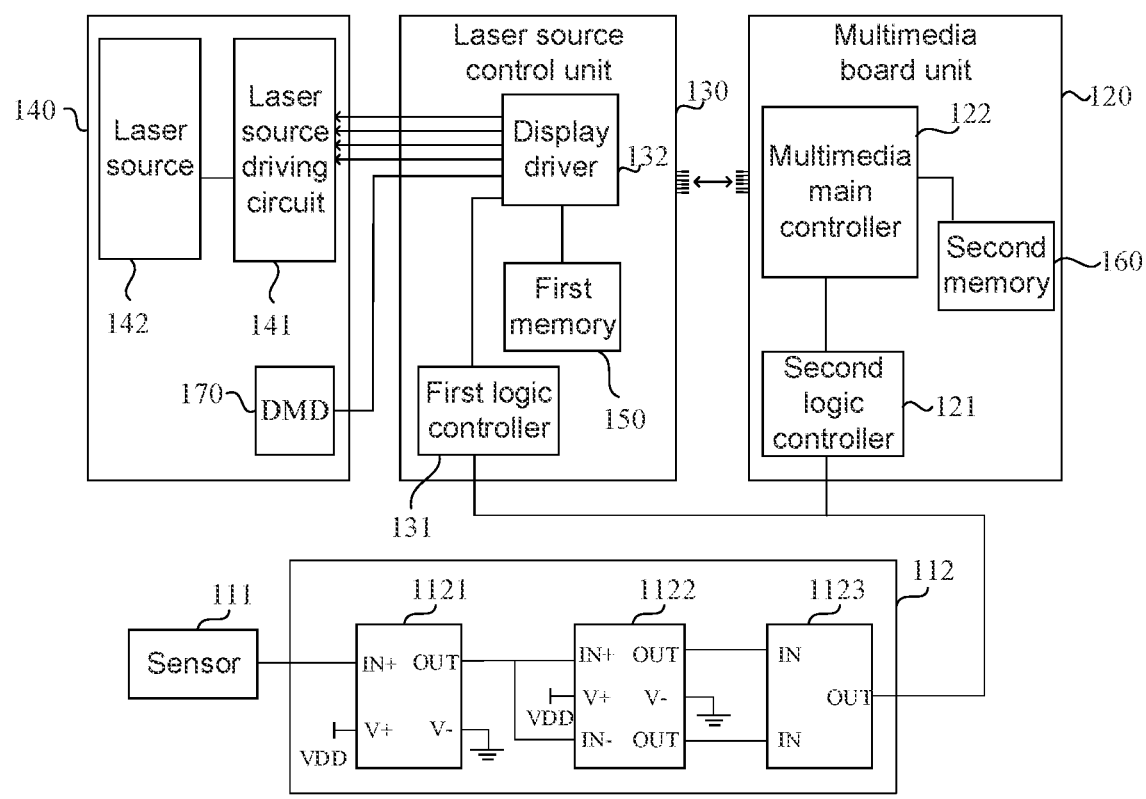
FIG. 6 is a diagram showing a structure of a projection apparatus, in accordance with some embodiments.

In some examples, the signal conversion circuit 112 is configured to: amplify the sensing signal, compare and logically process the amplified sensing signal to obtain the detection signal, and output the detection signal. For example, as shown in FIG. 6, the signal conversion circuit 112 includes an amplification sub-circuit 1121, a comparison sub-circuit 1122, and a logic sub-circuit 1123. A positive input (IN+) of the amplification sub-circuit 1121 is electrically connected to the sensor 111, and an output (OUT) of the amplification sub-circuit 1121 is electrically connected to a positive input (IN+) and a negative input (IN−) of the comparison sub-circuit 1122; a power supply terminal (V+) of the amplification sub-circuit 1121 is electrically connected to an external power supply VDD, and a ground terminal (V−) of the amplification sub-circuit 1121 is grounded. Two outputs (OUT) of the comparison sub-circuit 1122 are electrically connected to two inputs (IN) of the logic sub-circuit 1123 respectively, and a power supply terminal (V+) of the comparison sub-circuit 1122 is electrically connected to the external power supply VDD, and a ground terminal (V−) of the comparison sub-circuit 1122 is grounded. An output (OUT) of the logic sub-circuit 1123 is electrically connected to the laser source control unit 130 and the multimedia board unit 120.

The amplification sub-circuit 1121 is configured to amplify the sensing signal. The comparison sub-circuit 1122 is configured to compare an absolute value of an amplitude of the amplified sensing signal at each moment with a high voltage threshold and a low voltage threshold to obtain two pulse signals. The high voltage threshold and the low voltage threshold may be stored in the comparison sub-circuit 1122. The logic sub-circuit 1123 is configured to perform a logical OR operation on the two pulse signals to obtain the detection signal.

Figure 7:
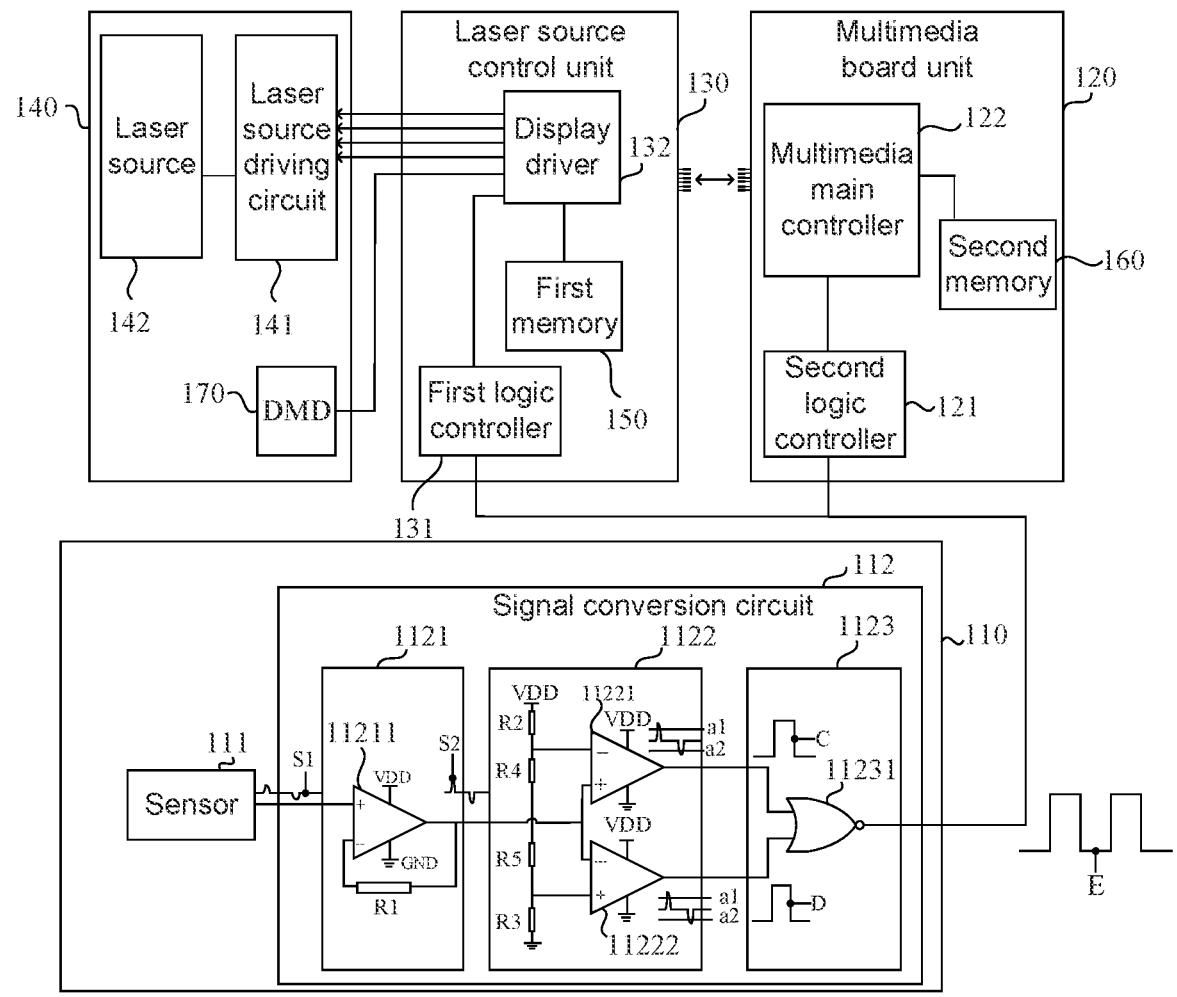
FIG. 7 is a diagram showing a structure of a projection apparatus, in accordance with some other embodiments.

In some examples, as shown in FIG. 7, the amplification sub-circuit 1121 includes a first operational amplifier 11211 and a first resistor R1. A non-inverting input pin of the first operational amplifier 11211 is connected to the sensor 111, and an inverting input pin and an output pin of the first operational amplifier 11211 are connected to both ends of the first resistor R1, a power supply pin of the first operational amplifier 11211 is connected to the external power supply VDD, and a ground pin of the first operational amplifier 11211 is grounded.

For example, the sensing signal sent by the sensor 111 is a signal S1, and the first operational amplifier 11211 receives the signal S1 through the non-inverting input pin, and amplifies an amplitude of the signal S1 to obtain a signal S2. For example, the maximum value of the signal S1 is 2 mv, and the maximum value of the signal S2 obtained by amplifying the signal S1 by the first operational amplifier 11211 is 2.5 v. For another example, the minimum value of the signal S1 is 0.5 mv, and the minimum value of the signal S2 obtained by amplifying the signal S1 by the first operational amplifier 11211 is 0.5 v.

In some examples, as shown in FIG. 7, the comparison sub-circuit 1122 includes a first comparator 11221, a second comparator 11222, a second resistor R2, a third resistor R3, a fourth resistor R4, and a fifth resistor R5. An inverting input pin of the first comparator 11221 is connected to the external power supply VDD through the second resistor R2, and is connected to a non-inverting input pin of the second comparator 11222 through the fourth resistor R4 and the fifth resistor R5. A non-inverting input pin of the first comparator 11221 is connected to an output pin of the first operational amplifier 11211, a power supply pin of the first comparator 11221 is connected to the external power supply VDD, and a ground pin of the first comparator 11221 is grounded.

An inverting input pin of the second comparator 11222 is connected to the output pin of the first operational amplifier 11211, the non-inverting input pin of the second comparator 11222 is grounded through the third resistor R3; a power supply pin of the second comparator 11222 is connected to the external power supply VDD, and a ground pin of the second comparator 11222 is grounded.

For example, a high voltage threshold a1 is achieved according to a formula of VDD×[(R4+R5+R3)/(R2+R4+R5+R3)], the non-inverting input pin of the first comparator 11221 receives the signal S2, and the first comparator 11221 compares an absolute value of an amplitude of the signal S2 at any moment with the high voltage threshold a1. When the absolute value of the amplitude of the signal S2 at a certain moment is greater than the high voltage threshold a1, the first comparator 11221 outputs a high level at that moment; when the absolute value of the amplitude of the signal S2 at a certain moment is less than the high voltage threshold a1, the first comparator 11221 outputs a low level at that moment, thereby obtaining a pulse signal C. A low voltage threshold a2 is achieved according to a formula of VDD×[R3/(R2+R4+R5+R3)]. The inverting input pin of the second comparator 11222 receives the signal S2, and the second comparator 11222 compares the absolute values of the amplitudes of the signal S2 at different moments with the low voltage threshold a2. When the absolute value of the amplitude of the signal S2 at a certain moment is greater than the low voltage threshold a2, the second comparator 11222 outputs a low level at that moment; when the absolute value of the amplitude of the signal S2 at a certain moment is less than a2, the second comparator 11222 outputs a high level at that moment, thereby obtaining a pulse signal D.

In some examples, as shown in FIG. 7, the logic sub-circuit 1123 includes a logical OR gate 11231. Two input pins of the logical OR gate 11231 are connected to output pins of the first comparator 11221 and the second comparator 11222, and an output pin of the logical OR gate 11231 is connected to the laser source control unit 130 and the multimedia board unit 120. The logical OR gate 11231 is configured to perform a logical OR operation on the pulse signal C and the pulse signal D to obtain a pulse signal E.

Figure 3:
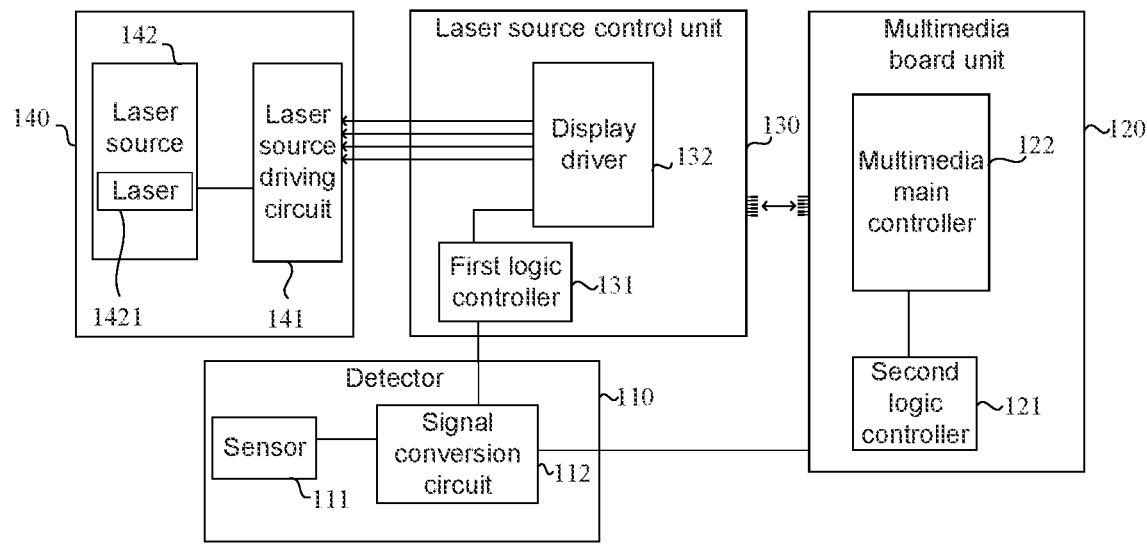
FIG. 3 is a block diagram of a projection apparatus, in accordance with yet some other embodiments.

In some embodiments, as shown in FIGS. 2 and 3, the laser source unit 140 includes a laser source driving circuit 141 and a laser source 142 electrically connected to the laser source driving circuit 141. The laser source driving circuit 141 is also electrically connected to the laser source control unit 130. The laser source driving circuit 141 is configured to receive an adjustment signal sent by the laser source control unit 130 and provide a driving signal to the laser source 142 based on the adjustment signal. The laser source 142 is configured to emit a beam with a corresponding brightness under driving of the driving signal.

Figure 4:
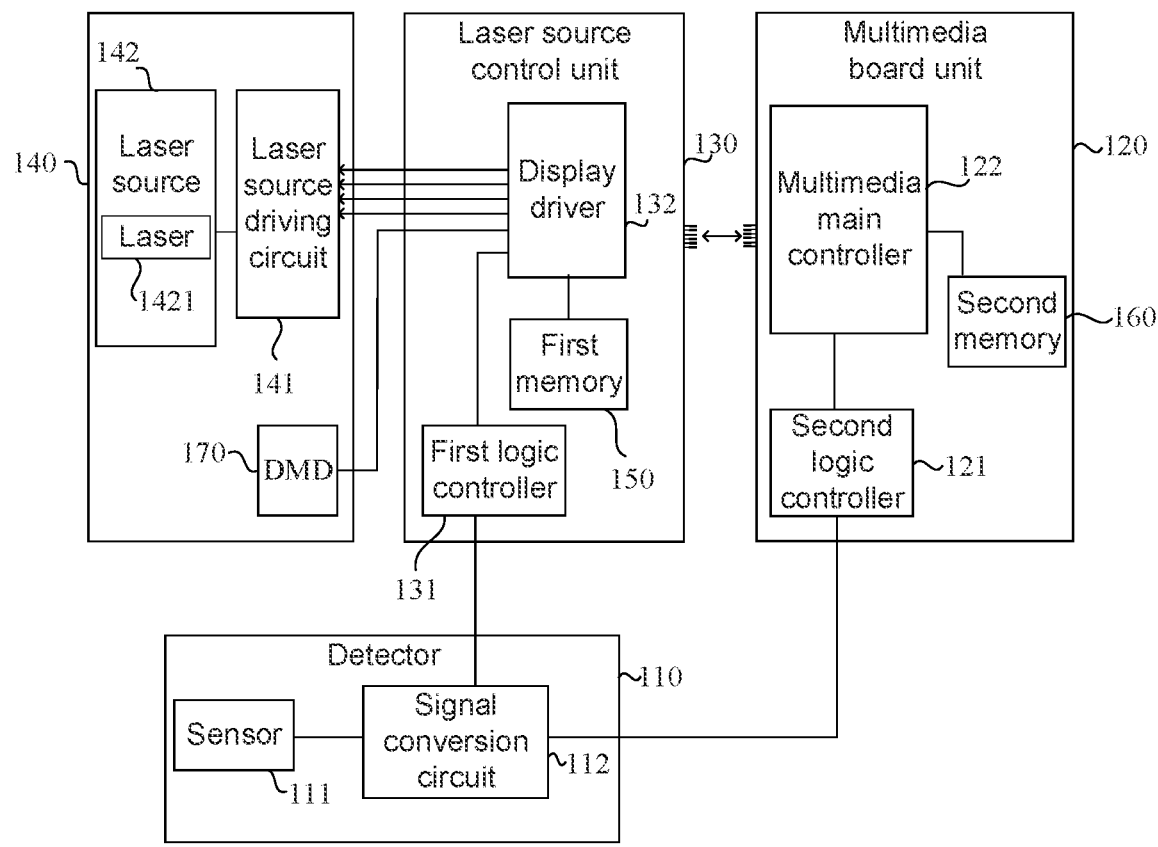
FIG. 4 is a block diagram of a projection apparatus, in accordance with yet some other embodiments.
Figure 5:
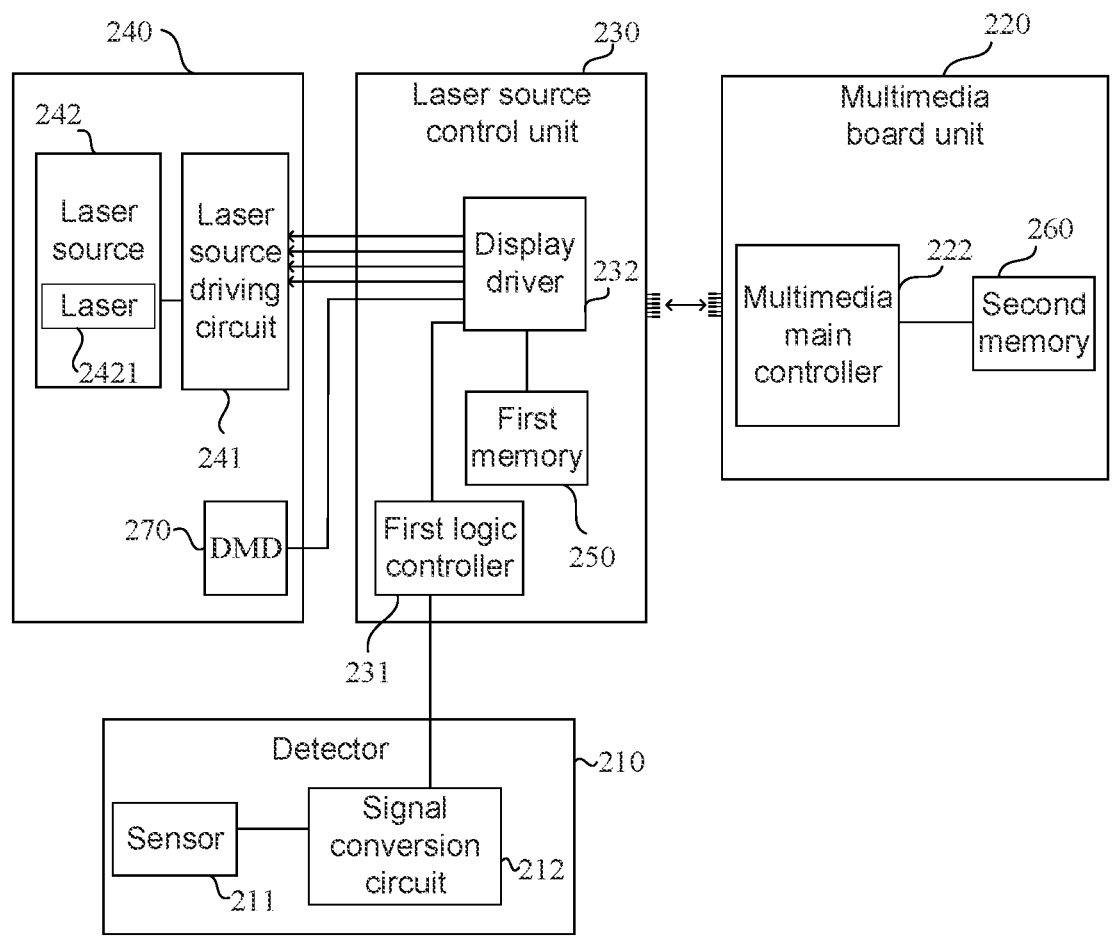
FIG. 5 is a block diagram of a projection apparatus, in accordance with yet some other embodiments.

In some examples, as shown in FIGS. 3-5, the laser source 142 includes at least one laser 1421. The laser 1421 is configured to emit a laser beam with a corresponding brightness under the driving of the driving signal. For example, the laser 1421 is a semiconductor laser or a solid-state laser.

In some examples, the adjustment signal sent by the laser source control unit 130 may be a pulse width modulation (PWM) signal. An implementation manner of carrying an adjusted projection parameter in the PWM signal may be that: the PWM signal has corresponding duty cycles for different values of the projection parameter. That is, the value of the projection parameter is reflected through the duty cycle.

In some examples, the laser source control unit 130 may send a PWM signal corresponding to red light, a PWM signal corresponding to green light, a PWM signal corresponding to blue light, and a PWM signal corresponding to yellow light to the laser source driving circuit 141. The PWM signal corresponding to the light of each color carries an adjusted projection parameter (e.g., brightness) corresponding to the light of the corresponding color. The laser source driving circuit 141 may determine the adjusted projection parameter corresponding to the light of each color according to the received PWM signal corresponding to the light of each color and provide a driving signal to the laser source 142 based on the adjusted projection parameter to control the light emission of the laser source 142. Controlling the light emission of the laser source 142 includes reducing a brightness of the laser source 142.

It will be noted that the laser source control unit 130 may also be configured to send an enable signal at an effective level to the laser source driving circuit 141 while sending the adjustment signal to the laser source driving circuit 141, so as to control the PWM signal to be input to the laser source driving circuit 141.

In some embodiments, as shown in FIG. 3, the laser source control unit 130 includes a first logic controller 131 and a display driver 132 connected to the first logic controller 131. The first logic controller 131 is also electrically connected to the signal conversion circuit 112. The display driver 132 is also electrically connected to the laser source driving circuit 141.

The first logic controller 131 is configured to: receive the detection signal sent by the signal conversion circuit 112, and send a first notification signal to the display driver 132 to notify the display driver 132 that there is the object B to be protected in the laser projection region A when it is determined that there is the object B to be protected in the laser projection region A based on the detection signal. The display driver 132 is configured to send an adjustment signal carrying an adjusted projection parameter to the laser source driving circuit 141 based on the first notification signal. The laser source driving circuit 141 is configured to provide a driving signal to the laser source 142 based on the adjustment signal. The laser source 142 is configured to emit a laser beam under driving of the driving signal.

The first logic controller 131 may be, for example, a single-chip microcomputer, a central processing unit (CPU), a microprocessor unit (MPU), an ARM (advanced RISC machine, wherein the RISC is short for a reduced instruction set computing) processor, or an integrated circuit (IC). The display driver 132 is, for example, a digital light processor.

In some examples, the first logic controller 131 is configured to: count the number of pulses of the detection signal per unit time when the detection signal is received, compare the number of pulses with a reference threshold, determine that there is the object B to be protected in the laser projection region A when the number is greater than or equal to the reference threshold, and send the first notification signal to the display driver 132, so that the display driver 132 adjusts the projection parameter. The first logic controller 131 is also configured to determine that there is no object B to be protected in the laser projection region A and does not send the first notification signal to the display driver 132 when the number of pulses is less than the reference threshold. The reference threshold may be determined based on energy of infrared rays emitted by the object B to be protected.

In some examples, the first logic controller 131 is also configured to send a first state indication signal to the display driver 132 when it is determined that there is no object B to be protected in the laser projection region A. The first state indication signal is used to indicate that there is no object B to be protected in the laser projection region A. For example, a level of the first state indication signal continues to be high.

A connection between the first logic controller 131 and the display driver 132 may be established through a communication protocol. The first notification signal may be a signal that complies with a corresponding communication protocol. For example, an I$^2$C (a serial communication bus) connection may be established between the first logic controller 131 and the display driver 132, and the first notification signal may be an I$^2$C signal.

In some embodiments, the laser source control unit 130 is also configured to: start timing when it is determined that there is the object B to be protected in the laser projection region A of the laser source unit 140 based on the detection signal, and send an adjustment signal carrying a shutdown instruction to the laser source unit 140 after a preset time and when it is determined that there is still the object B to be protected in the laser projection region A based on the detection signal. The laser source unit 140 is configured to perform a shutdown operation in response to the adjustment signal carrying the shutdown instruction. The laser source control unit 130 is also configured to send an adjustment signal carrying an unadjusted projection parameter to the laser source unit 140 after the preset time and when it is determined that there is no object B to be protected in the laser projection region A. The laser source unit 140 is configured to emit a light beam in response to the adjustment signal carrying the unadjusted projection parameter. For example, the preset time is 5 s. The projection apparatus 100 stores a preset projection parameter, and a user may adjust the preset projection parameter. The unadjusted projection parameter may be the preset projection parameter or may be a new preset projection parameter after the preset projection parameter being adjusted by the user.

In some examples, the first logic controller 131 is configured to receive the detection signal sent by the signal conversion circuit 112, determine whether there is the object B to be protected in the laser projection region A based on the detection signal, and start timing when it is determined that there is the object B to be protected in the laser projection region A. The first logic controller 131 includes, for example, a timer, which may achieve timing.

The first logic controller 131 is also configured to send a third notification signal to the display driver 132 after the preset time and when it is determined that there is still the object B to be protected in the laser projection region A. The display driver 132 is configured to send the adjustment signal carrying the shutdown instruction to the laser source driving circuit 141 based on the third notification signal. The laser source driving circuit 141 is configured to provide a driving signal to the laser source 142 based on the adjustment signal. The laser source 142 is configured to be turned off under the driving of the driving signal.

The first logic controller 131 is also configured to send a fourth notification signal to the display driver 132 after the preset time and when it is determined that there is no object B to be protected in the laser projection region A. The display driver 132 is configured to send an adjustment signal carrying the unadjusted projection parameter to the laser source driving circuit 141 based on the fourth notification signal. The display driver 132 is also configured to: obtain image information of a preset image or image information of a new preset image after the preset image being adjusted by the user from a first memory 150 when the fourth notification signal is received from the first logic controller 131, and send a control signal to a digital micromirror device (DMD) 170 based on the image information. The laser source driving circuit 141 is configured to provide a driving signal to the laser source 142 based on the adjustment signal. The laser source 142 is configured to emit a light beam under the driving of the driving signal. The DMD 170 is configured to modulate the laser beam emitted by the laser source 142 under control of the control signal to obtain a projection beam for displaying the image.

In some embodiments, as shown in FIG. 1, the detector 110 is also configured to send the detection signal to the multimedia board unit 120. The multimedia board unit 120 is configured to: receive the detection signal when the multimedia board unit 120 is started up, and send a stop instruction signal to the laser source control unit 130, so that the laser source control unit 130 stops determining whether there is the object B to be protected in the laser projection region A based on the stop instruction signal. The multimedia board unit 120 is also configured to send a first instruction signal to the laser source control unit 130 when it is determined that there is the object B to be protected in the laser projection region A of the laser source unit 140 based on the detection signal. The first instruction signal is used to indicate that there is the object B to be protected in the laser projection region A. The laser source control unit 130 is further configured to send the adjustment signal carrying the adjusted projection parameter to the laser source unit 140 based on the first instruction signal. The laser source unit 140 may be configured to reduce the light emission luminance of the at least one laser according to the projection parameter in the adjustment signal.

In some examples, as shown in FIG. 3, the multimedia board unit 120 includes a second logic controller 121 and a multimedia main controller 122 electrically connected to the second logic controller 121. The second logic controller 121 is also electrically connected to the signal conversion circuit 112. The multimedia main controller 122 is also connected to the first logic controller 131. The second logic controller 121 is configured to: receive the detection signal, and send a second notification signal to the multimedia main controller 122 when it is determined that there is the object B to be protected in the laser projection region A based on the detection signal. The second notification signal is used to indicate that there is the object B to be protected in the laser projection region A. The multimedia main controller 121 is configured to send the stop instruction signal to the first logic controller 131 when the multimedia main controller 121 is started up, and send the first instruction signal to the first logic controller 131 when the second notification signal is received. The first logic controller 131 is further configured to stop determining whether there is the object B to be protected in the laser projection region A based on the detection signal after receiving the stop instruction signal, and send the first notification signal to the display driver 132 based on the first instruction signal, so as to notify the display driver 132 that there is the object B to be protected in the laser projection region A.

The second logic controller 121 may be, for example, the single-chip microcomputer, the CPU, the MPU, the ARM processor, or the IC. The multimedia main controller 122 may be, for example, the single-chip microcomputer, the CPU, the MPU, the ARM processor, or the IC.

A process of the second logic controller 121 determining whether there is the object B to be protected in the laser projection region A may be referred to the above process of the first logic controller 131 determining whether there is the object B to be protected in the laser projection region A, which will not be repeated herein.

An effective level of the second notification signal may be a high level or a low level. For example, the effective level of the second notification signal is a high level, and when determining that there is the object B to be protected in the laser projection region A, the second logic controller 121 sends the second notification signal at the high level to the multimedia main controller 122; when determining that there is no object B to be protected in the laser projection region A, the second logic controller 121 sends a second state indication signal at the low level to the multimedia main controller 122.

A connection may be established between the multimedia main controller 122 and the first logic controller 131 through a communication protocol, and the first instruction signal and the stop instruction signal may be signals complying with the communication protocol. For example, assuming that an I$^2$C connection is established between the multimedia main controller 122 and the first logic controller 131, then both the first instruction signal and the stop instruction signal may be I$^2$C signals.

It can be seen from the above that an operating process of the projection apparatus 100 is different before and after the multimedia board unit 120 is started up. The operating principle of the projection apparatus 100 before and after the multimedia board unit 120 is started up will be described below.

For example, after the projection apparatus 100 receives the power-on instruction and before the multimedia board unit 120 is started up, the operating principle of the projection apparatus 100 is as follows. The sensor 111 collects the infrared signal emitted by the object B to be protected, converts the infrared signal into a sensing signal, and sends the sensing signal to the signal conversion circuit 112. The sensing signal is an electrical signal. The signal conversion circuit 112 receives the sensing signal, converts the sensing signal into a detection signal, and sends the detection signal to the laser source control unit 130. The laser source control unit 130 receives the detection signal, determines whether there is the object B to be protected in the laser projection region A of the laser source unit 140 based on the detection signal, and adjusts the projection parameter and sends the adjustment signal to the laser source driving circuit 141 when it is determined that there is the object B to be protected in the laser projection region A. The adjustment signal carries the adjusted projection parameter. The laser source driving circuit 141 provides the driving signal to the laser source 142 based on the adjustment signal. The laser source 142 emits the laser beam under the driving of the driving signal.

For example, after the multimedia board unit 120 is started up, the operating principle of the projection apparatus 100 is as follows. The sensor 111 collects the infrared signal emitted by the object B to be protected, converts the infrared signal into the sensing signal, and sends the sensing signal to the signal conversion circuit 112. The signal conversion circuit 112 receives the sensing signal, converts the sensing signal into the detection signal, and sends the detection signal to the multimedia board unit 120. The multimedia board unit 120 receives the detection signal, determines whether there is the object B to be protected in the laser projection region A of the laser source unit 140 based on the detection signal, and sends the first instruction signal and the stop instruction signal to the laser source control unit 130 when it is determined that there is the object B to be protected in the laser projection region A. The first instruction signal is used to indicate that there is the object B to be protected in the laser projection region A. The stop instruction signal makes the laser source control unit 130 to stop determining whether there is the object B to be protected in the laser projection region A. The laser source control unit 130 adjusts the projection parameter based on the first instruction signal, and sends the adjustment signal carrying the adjusted projection parameter to the laser source driving circuit 141. The laser source driving circuit 141 provides the driving signal to the laser source 142 based on the adjustment signal. The laser source 142 emits the laser beam under the driving of the driving signal.

In some embodiments, as shown in FIG. 4, the laser source unit 140 further includes a light valve. The light valve is, for example, a digital micromirror device (DMD) 170. The projection apparatus 100 further includes a projection lens. The DMD 170 is electrically connected to the laser source control unit 130, and is configured to modulate the laser beam based on an image signal of an image to be displayed from the laser source control unit 130 to obtain a projection beam. The projection lens is configured to project the projection beam on a wall or a screen for imaging.

The DMD 170 includes, for example, a plurality of micromirrors arranged in an array, and the plurality of micromirrors may correspond to a plurality of pixel points in the image to be displayed. For example, the plurality of micromirrors and the plurality of pixel points are in one-to-one correspondence. Each micromirror is equivalent to a digital switch. The micromirror may swing by a range of plus or minus 12 degrees (i.e., ±12°) or a range of plus or minus 17 degrees (i.e., ±17°) under an action of an external force. In a case where the micromirror is at a positive deflection angle, the laser beam emitted by the laser 1421 is reflected by the micromirror and enters the projection lens for projection imaging. In this case, the micromirror is in an ON state. In a case where the micromirror is at a negative deflection angle, the laser beam emitted by the laser 1421 does not enter the projection lens after being reflected by the micromirror (usually irradiating on the housing of the projection apparatus 100). In this case, the micromirror is in an OFF state. By controlling a state (the ON state or the OFF state) that each micromirror in the DMD 170 is in and a duration of each state in a display cycle of a frame image according to the image signal, luminance (a gray scale) of a pixel corresponding to the micromirror may be controlled, so as to modulate the laser beam projected onto the DMD 170.

In some embodiments, the projection apparatus 100 is also configured to display a first prompt image A1 when it is determined that there is the object B to be protected in the laser projection region A, so as to prompt the user to stay away from the laser projection region A, thereby achieving interaction with the user.

In this case, as shown in FIG. 4, the projection apparatus 100 further includes the first memory 150 connected to the display driver 132, and the first memory 150 is configured to store image information of the first prompt image A1. The laser source control unit 130 is further configured to obtain the image information of the first prompt image A1 from the first memory 150, and send a first control signal to the laser source unit 140 based on the image information of the first prompt image A1 when it is determined that there is the object B to be protected in the laser projection region A. The laser source unit 140 is further configured to modulate the beam to obtain a beam for displaying the first prompt image A1 in response to the first control signal.

Figure 13:
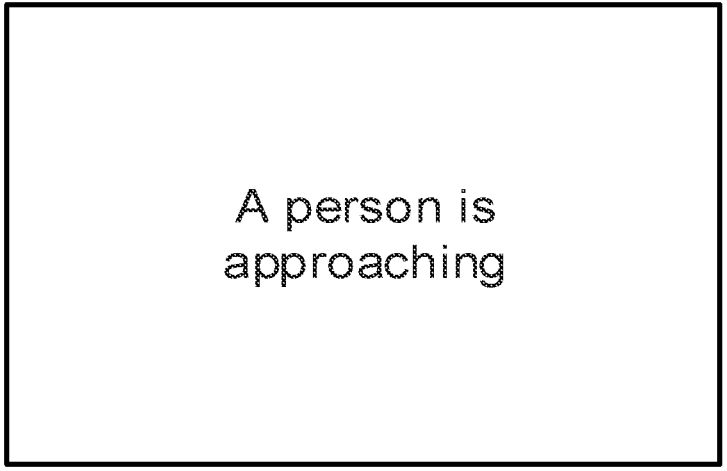
FIG. 13 is a schematic diagram of a first prompt image, in accordance with some embodiments.

As shown in FIG. 13, the first prompt image A1 may be a static prompt image. For example, the first prompt image A1 includes a static pattern of "A person is approaching" (e.g., including fonts and/or images), and the image information of the first prompt image A1 may be pixel data of the first prompt image A1.

The first memory 150 may be disposed outside the laser source control unit 130 or inside the laser source control unit 130. A position of the first memory 150 is not limited in the embodiments of the present disclosure. FIG. 4 shows a situation where the first memory 150 is disposed inside the laser source control unit 130.

The first memory 150 may be, for example, a random access memory (RAM), a flash memory, a read only memory (ROM), an erasable programmable ROM (EPROM), an electrically EPROM (EEPROM), a register, a hard disk, a mobile hard disk, a compact disc read only memory (CD-ROM) or a storage medium of any other form known in the art.

In some examples, as shown in FIG. 4, the first logic controller 131 is configured to receive the detection signal sent by the signal conversion circuit 112, determine whether there is the object B to be protected in the laser projection region A based on the detection signal, and send the first notification signal to the display driver 132 when it is determined that there is the object B to be protected in the laser projection region A. Alternatively, the second logic controller 121 is configured to receive the detection signal sent by the signal conversion circuit 112, determine whether there is the object B to be protected in the laser projection region A based on the detection signal, and send the second notification signal to the multimedia main controller 122 when it is determined that there is the object B to be protected in the laser projection region A; the multimedia main controller 121 is configured to send the first instruction signal to the first logic controller 131 when receiving the second notification signal; the first logic controller 131 is configured to send the first notification signal to the display driver 132 based on the first instruction signal.

The display driver 132 is further configured to: obtain the image information of the first prompt image A1 from the first memory 150 when receiving the first notification signal from the first logic controller 131, and send the first control signal to the DMD 170 based on the image information of the first prompt image A1. The laser source 142 is configured to emit the beam in response to the adjustment signal. The DMD 170 is configured to modulate the laser beam emitted by the laser source 142 under the control of the first control signal to obtain a projection beam for displaying the first prompt image A1.

The micromirror of the DMD 170 may be configured to change a rotation angle in response to the first control signal, so that the beam emitted by the laser 1421 passes by the DMD 170 to form the first prompt image A1 on the projection lens. For example, the micromirror may rotate at a positive rotation angle in response to the first control signal. The beam emitted by the laser 1421 is irradiated onto the micromirror and reflected by the micromirror to the lens for imaging. In addition, the micromirror may rotate at a negative rotation angle in response to the first control signal. The beam emitted by the laser 1421 is irradiated onto the micromirror, and cannot be incident into the projection lens after being reflected by the micromirror.

An implementation process of displaying the first prompt image A1 is as follows. The first logic controller 131 receives the detection signal sent by the signal conversion circuit 112, determines whether there is the object B to be protected in the laser projection region A based on the detection signal, and sends the first notification signal to the display driver 132 when it is determined that there is the object B to be protected in the laser projection region A. Alternatively, the second logic controller 121 receives the detection signal sent by the signal conversion circuit 112, determines whether there is the object B to be protected in the laser projection region A based on the detection signal, and sends the second notification signal to the multimedia main controller 122 when it is determined that there is the object B to be protected in the laser projection region A; the multimedia main controller 122 sends the first instruction signal to the first logic controller 131 when receiving the second notification signal; the first logic controller 131 sends the first notification signal to the display driver 132 based on the first instruction signal. When receiving the first notification signal, the display driver 132 adjusts the projection parameter, sends the adjustment signal carrying the adjusted projection parameter to the laser source driving circuit 141, and obtains the image information of the first prompt image A1 from the first memory 150, and sends the first control signal to the DMD 170 based on the image information of the first prompt image A1. The laser source driving circuit 141 provides the driving signal to the laser source 142 based on the adjustment signal. The laser source 142 emits the laser beam under the driving of the driving signal. Under the control of the first control signal, the DMD 170 modulates the laser beam to obtain the projection beam.

In some embodiments, the projection apparatus 100 is also configured to display a second prompt image A2 when it is determined that there is the object B to be protected in the laser projection region A to prompt the user to stay away from the laser projection region A, thereby achieving the interaction with the user.

In this case, as shown in FIG. 4, the projection apparatus 100 further includes a second memory 160, and the second memory 160 is configured to store image information of the second prompt image A2. The multimedia board unit 120 is also configured to obtain the image information of the second prompt image A2 from the second memory 160, and send a display signal to the laser source control unit 130 when it is determined that there is the object B to be protected in the laser projection region A. The display signal carries the image information of the second prompt image A2. The laser source control unit 130 is also configured to send a second control signal to the laser source unit 140 based on the display signal. The laser source unit 140 is also configured to modulate the beam in response to the second control signal to obtain a projection beam for displaying the second prompt image A2.

Figure 14:
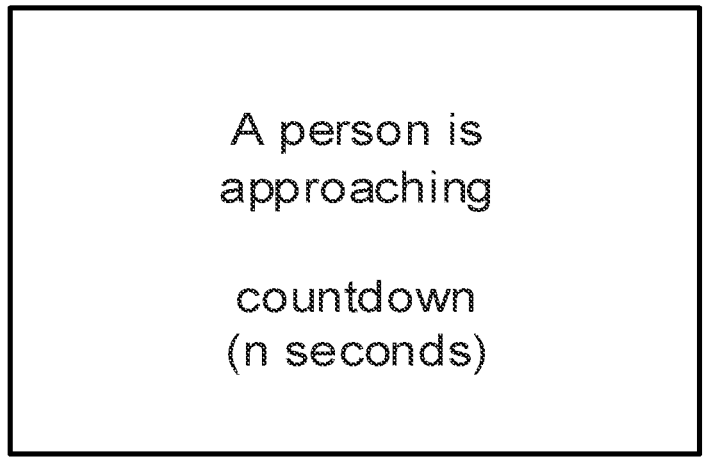
FIG. 14 is a schematic diagram of a second prompt image, in accordance with some embodiments.

As shown in FIG. 14, the second prompt image A2 may be a dynamic prompt image. For example, the second prompt image A2 includes the static pattern of "A person is approaching" and a dynamic pattern of "countdown (n seconds)", and the image information of the second prompt image A2 may be pixel data of the second prompt image A2. The letter n is a positive integer, and a value of n displayed at different time is different. This setting may improve a display effect of the prompt image.

The second memory 160 may be, for example, disposed outside the multimedia board unit 120, or may be disposed inside the multimedia board unit 120, and a position of the second memory 160 is not limited in the embodiments of the present disclosure. FIG. 4 shows a situation where the second memory 160 is disposed inside the multimedia board unit 120.

The second memory 160 may be, for example, the random access memory (RAM), the flash memory, the read only memory (ROM), the erasable programmable ROM (EPROM), the electrically EPROM (EPROM), the register, the hard disk, the mobile hard disk, the compact disc read only memory (CD-ROM) or the storage medium of any other form known in the art.

In some examples, as shown in FIG. 4, the second logic controller 121 is configured to receive the detection signal sent by the signal conversion circuit 112, determine whether there is the object B to be protected in the laser projection region A based on the detection signal, and send the second notification signal to the multimedia main controller 122 when it is determined that there is the object B to be protected in the laser projection region A. The multimedia main controller 122 is further configured to obtain the image information of the second prompt image A2 from the second memory 160 when receiving the second notification signal, and send the display signal to the display driver 132. The display signal carries the image information of the second prompt image A2. The display driver 132 is further configured to send the second control signal to, for example, the DMD 170 based on the display signal. In this case, the laser source 142 is configured to emit a beam in response to the adjustment signal. The DMD 170 is configured to modulate the laser beam emitted by the laser source 142 under control of the second control signal to obtain a projection beam for displaying the second prompt image A2.

An implementation process of displaying the second prompt image A2 is as follows. The second logic controller 121 receives the detection signal sent by the signal conversion circuit 112, determines whether there is the object B to be protected in the laser projection region A based on the detection signal, and sends the second notification signal to the multimedia main controller 122 when it is determined that there is the object B to be protected in the laser projection region A. When receiving the second notification signal, the multimedia main controller 122 sends the first instruction signal to the first logic controller 131, and obtains the image information of the second prompt image A2 from the second memory 160, and sends a display signal to the display driver 132. The first logic controller 131 sends the first notification signal to the display driver 132 based on the first instruction signal. The display driver 132 adjusts the projection parameter in response to the first notification signal, and sends the adjustment signal carrying the adjusted projection parameter to the laser source driving circuit 141. The laser source driving circuit 141 provides the driving signal to the laser source 142 based on the adjustment signal, and the laser source 142 emits a laser beam under the driving of the driving signal.

The display driver 132 transmits the second control signal to the DMD 170 based on the display signal. Each micromirror of the DMD 170 changes the rotation angle based on the second control signal, so that light emitted by the laser 1421 in the laser source 142 may form the second prompt image A2 on the projection lens after passing by the DMD 170. The modulation of the beam by the DMD 170 based on the second control signal may be referred to the modulation of the beam by the DMD 170 based on the first control signal, which will not be repeated herein.

In some embodiments, the projection apparatus 100 is also configured to superimpose and display the first prompt image A1 and the second prompt image A2 when it is determined that there is the object B to be protected in the laser projection region A, so as to prompt the user to stay away from the laser projection region A, thereby achieving the interaction with the user.

The implementation process of superimposing and displaying the first prompt image A1 and the second prompt image A2 is as follows. The second logic controller 121 receives the detection signal sent by the signal conversion circuit 112, determines whether there is the object B to be protected in the laser projection region A based on the detection signal, and sends the second notification signal to the multimedia main controller 122 when it is determined that there is the object B to be protected in the laser projection region A. When receiving the second notification signal, the multimedia main controller 122 sends the first instruction signal to the first logic controller 131, and obtains the image information of the second prompt image A2 from the second memory 160, and sends the display signal to the display driver 132. The display driver 132 transmits the second control signal to the DMD 170 based on the display signal.

The first logic controller 131 sends the first notification signal to the display driver 132 based on the first instruction signal. The display driver 132 adjusts the projection parameter in response to the first notification signal, and sends the adjustment signal carrying the adjusted projection parameter to the laser source driving circuit 141; the display driver 132 further obtains the image information of the first prompt image A1 from the first memory 150, and sends the first control signal to the DMD 170 based on the image information of the first prompt image A1.

The laser source driving circuit 141 provides the driving signal to the laser source 142 based on the adjustment signal, and the laser source 142 emits a laser beam under the driving of the driving signal. Under the control of the first control signal and the second control signal, the DMD 170 modulates the laser beam to obtain a projection beam.

In some embodiments, the multimedia board unit 120 is also configured to start timing when it is determined that there is the object B to be protected in the laser projection region A of the laser source unit 140, and send a fourth instruction signal to the laser source control unit 130 after the preset time and when it is determined that there is still the object B to be protected in the laser projection region A based on the detection signal. The laser source control unit 130 is further configured to send an adjustment signal carrying a shutdown instruction to the laser source unit 140 based on the fourth instruction signal. The laser source unit 140 is configured to perform a shutdown operation in response to the adjustment signal carrying the shutdown instruction. The multimedia board unit 120 is also configured to send a fifth instruction signal to the laser source control unit 130 after the preset time and when it is determined that there is no object B to be protected in the laser projection region A based on the detection signal. The laser source control unit 130 is also configured to send the adjustment signal carrying the unadjusted projection parameter to the laser source unit 140 based on the fifth instruction signal. The laser source unit 140 is configured to emit a light beam in response to the adjustment signal carrying the unadjusted projection parameter. For example, the preset time is 5 s.

In some examples, the second logic controller 121 is also configured to start timing when it is determined that there is the object B in the laser projection region A based on the detection signal, and send a fifth notification signal to the multimedia main controller 122 after the preset time and when it is determined that there is still the object B to be protected in the laser projection region A based on the detection signal. The multimedia main controller 121 is configured to send the fourth instruction signal to the first logic controller 131 when receiving the fifth notification signal. The first logic controller 131 is also configured to send the third notification signal to the display driver 132 based on the fourth instruction signal. The display driver 132 is configured to send the adjustment signal carrying the shutdown instruction to the laser source driving circuit 141 based on the third notification signal. The laser source driving circuit 141 is configured to provide a driving signal to the laser source 142 based on the adjustment signal. The laser source 142 is configured to be turned off under the driving of the driving signal. For example, the second logic controller 121 includes a timer, and the timing may be achieved through the timer.

The second logic controller 131 is also configured to send a sixth notification signal to the multimedia main controller 122 after the preset time and when it is determined that there is no object B to be protected in the laser projection region A based on the detection signal. The multimedia main controller 121 is configured to send the fifth instruction signal to the first logic controller 131 when receiving the sixth notification signal. The first logic controller 131 sends the fourth notification signal to the display driver 132 based on the fifth instruction signal. The display driver 132 is configured to send an adjustment signal carrying an unadjusted projection parameter to the laser source driving circuit 141 based on the fourth notification signal. The display driver 132 is further configured to: obtain image information of a preset image or image information of a new preset image after the preset image being adjusted by the user from a first memory 150 when the fourth notification signal is received from the first logic controller 131, and send a control signal to a digital micromirror device (DMD) 170 based on the image information. The laser source driving circuit 141 is configured to provide a driving signal to the laser source 142 based on the adjustment signal. The laser source 142 is configured to emit a light beam under the driving of the driving signal. The DMD 170 is configured to modulate the laser beam emitted by the laser source 142 under control of the control signal to obtain a projection beam for displaying the image.

For example, an operator may set a countdown threshold in advance, and during a display of the second prompt image A2, an image in which a value of n gradually decreases from the countdown threshold to 0 may be displayed. Before the value of n is reduced from the countdown threshold to 0 (that is, before an end of the countdown), if it is continuously determined that there is the object B to be protected in the laser projection region A, the laser source driving circuit 141 may continuously send a driving signal based on the adjusted projection parameter, so as to drive the laser source 142 to continuously emit light whose parameter conforms to the projection parameter. When n is reduced to 0 (that is, at the end of the countdown), if there is no object B to be protected in the laser projection region A, the laser source driving circuit 141 may send a driving signal based on the unadjusted projection parameter of the laser source control unit 130, so as to drive the laser source 142 to emit light based on the unadjusted projection parameter. If there is still the object B to be protected in the laser projection region A, the laser source control unit 130 may control the laser source driving circuit 141 to turn off the laser source 142 by adjusting the projection parameter.

In some embodiments, the multimedia main controller 122 is further configured to send a sensitivity control signal to the signal conversion circuit 112 through the second logic controller 121 to control a sensitivity of the signal conversion circuit 112. The sensitivity indicates a degree of sensitivity of the signal conversion circuit 112 to the sensing signal sent by the sensor 111.

In some examples, in a case where a level of the sensitivity control signal is a high level, the signal conversion circuit 112 responds to the high-level sensitivity control signal, and its sensitivity becomes high, so that the signal conversion circuit 112 has a high degree of sensitivity to the sensing signal sent by the sensor 111. In a case where the level of the sensitivity control signal is a low level, the signal conversion circuit 112 responds to the low-level sensitivity control signal, and its sensitivity becomes low, so that the signal conversion circuit 112 has a low degree of sensitivity to the sensing signal sent by the sensor 111.

The larger an amplification factor of the signal conversion circuit 112 is, the higher the sensitivity is; the smaller the amplification factor of the signal conversion circuit 112 is, the lower the sensitivity is.

It will be noted that, the multimedia main controller 122 may run a boot layer, a driver layer, a framework layer, and an application layer. During a startup process of the multimedia main controller 122, the multimedia main controller 122 is started layer by layer from the boot layer to the application layer. After the application layer is started up, the multimedia main controller 122 is started up.

For example, the signal conversion circuit 112 in the detector 110, the laser source driving circuit 141 in the laser source unit 140, the laser source control unit 130, and the multimedia board unit 120 are integrated on one circuit board. The signal conversion circuit 112, the laser source driving circuit 141, the laser source control unit 130, and the multimedia board unit 120 may be separated or integrated in one chip.

Figure 8:
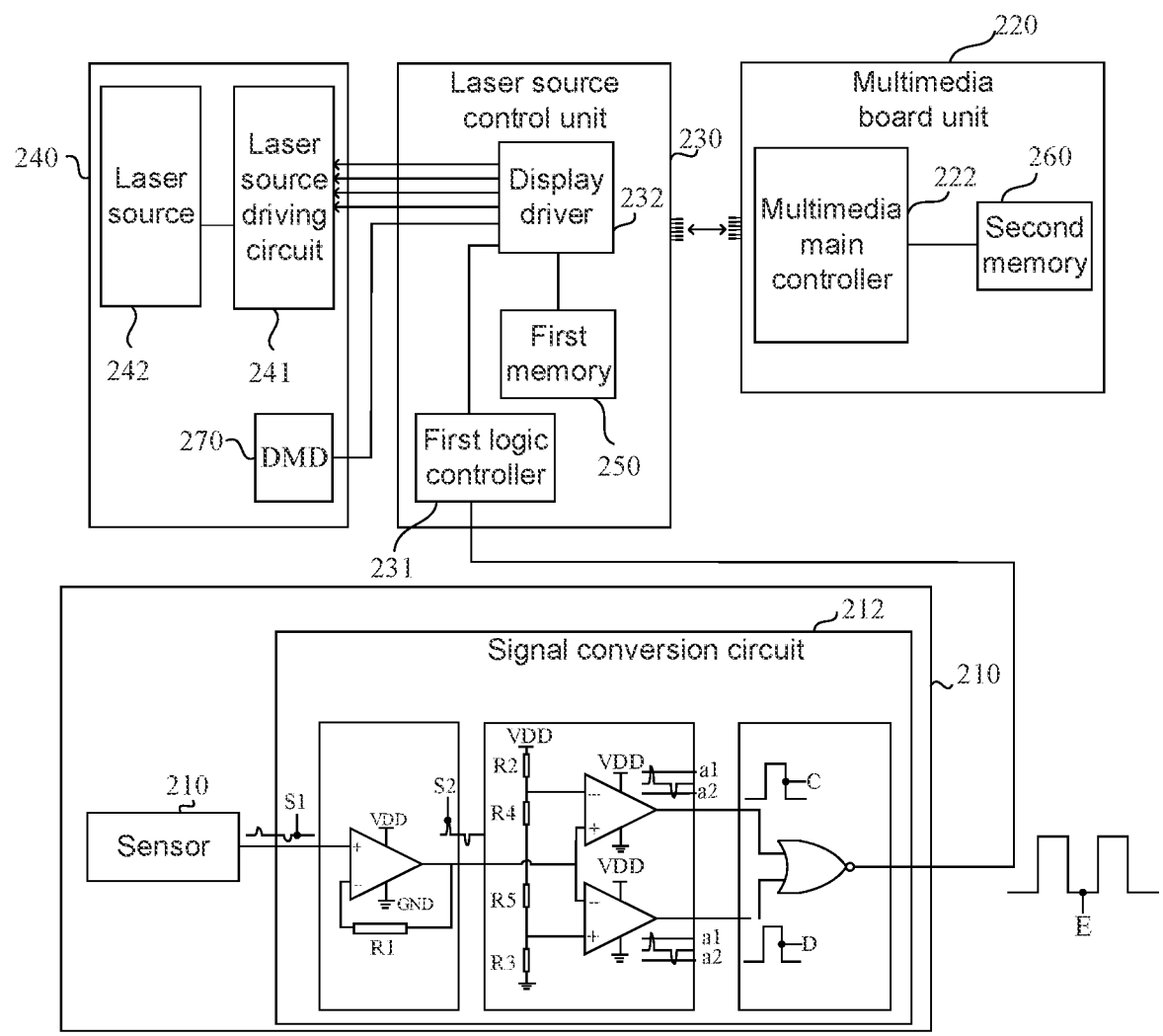
FIG. 8 is a diagram showing a structure of a projection apparatus, in accordance with yet some other embodiments.

FIG. 5 is a block diagram of a projection apparatus in accordance with some other embodiments, and FIG. 8 is a diagram showing a structure of a projection apparatus in accordance with some other embodiments.

As shown in FIGS. 5 and 8, the projection apparatus 200 includes a detector 210, a laser source control unit 230, and a laser source unit 240. The detector 210 is connected to the laser source control unit 230, and the laser source control unit 230 is also connected to the laser source unit 240.

The detector 210 is configured to obtain a detection signal for indicating whether there is the object B to be protected in the laser projection region A, and send the detection signal to the laser source control unit 230.

The laser source control unit 230 is configured to: receive the detection signal, and send an adjustment signal carrying an adjusted projection parameter to the laser source unit 240 when it is determined that there is the object B to be protected in the laser projection region A based on the detection signal. The projection parameter is used to indicate a light emission luminance of at least one laser 2421 in the laser source unit 240. The object B to be protected may be a living body. For example, the object B to be protected may be a person.

The laser source unit 240 is configured to perform operations in response to the adjustment signal. For example, the laser source unit 240 responds to the adjustment signal, so that at least one laser 2421 therein reduces its light emission luminance.

In the projection apparatus provided by the embodiments of the present disclosure, the laser source control unit 230 may instruct the laser source unit 240 to reduce the light emission luminance based on the adjusted projection parameter, so that the projection apparatus 200 may achieve the human eye protection function, thereby improving the practicability of the projection apparatus 200.

It will be noted that internal structures and operating principles of the detector 210, the laser source control unit 230, and the laser source unit 240 in the embodiments of the present disclosure are respectively the same as internal structures and operating principles of the detector 110, the laser source control unit 130 and the laser source 140 in the above embodiments, which will not be repeated herein.

Once the projection apparatus 200 receives the power-on instruction, the operating principle of the projection apparatus 200 is as follows. The sensor 211 is configured to collect an infrared signal emitted by the object B to be protected, convert the collected infrared signal into a sensing signal, and send the sensing signal to the signal conversion circuit 212. The signal conversion circuit 212 is configured to receive the sensing signal, convert the sensing signal into a detection signal, and send the detection signal to the laser source control unit 230. The laser source control unit 230 is configured to receive the detection signal, determine whether there is the object B to be protected in the laser projection region A based on the detection signal, and adjust the projection parameter and send an adjustment signal carrying an adjusted projection parameter to the laser source driving circuit 241 when it is determined that there is the object B to be protected in the laser projection region A. The laser source driving circuit 241 is configured to provide the driving signal to the laser source 242 based on the adjustment signal. The laser source 242 is configured to emit light under the driving of the driving signal.

In some embodiments, the projection apparatus 200 is also configured to display the first prompt image A1 when it is determined that there is the object B to be protected in the laser projection region A to prompt the user to stay away from the laser projection region A, thereby achieving the interaction with the user. In this case, the projection apparatus 200 further includes a first memory 250, which is connected to a display driver 232 of the laser source control unit 230 and is configured to store the image information of the first prompt image A1.

The process of displaying the first prompt image A1 by the projection apparatus 200 may be referred to the process of displaying the first prompt image A1 in the above embodiments, which will not be repeated herein.

In some embodiments, the projection apparatus 200 further includes a multimedia board unit 220 and a second memory 260. The multimedia board unit 220 includes a multimedia main controller 222. That is, the multimedia board unit 220 does not include the second logic control circuit. The second memory 260 is connected to the multimedia main controller 222 and is configured to store the image information of the second prompt image A2.

The multimedia main controller 222 is configured to send a second instruction signal to the first logic controller 231 of the laser source control unit 230 when the multimedia main controller 222 is started up, and the second instruction signal is used to indicate that the multimedia main controller 222 has been started up.

The first logic controller 231 is further configured to send a third instruction signal to the multimedia main controller 222 based on the second instruction signal when it is determined that there is the object B to be protected in the laser projection region A, and the third instruction signal is used to indicate that there is the object B to be protected in the laser projection region A.

The multimedia main controller 222 is further configured to obtain the image information of the second prompt image A2 from the second memory 260 based on the third instruction signal, and send a display signal to the display driver 232 of the laser source control unit 230. The display signal carries the image information of the second prompt image A2.

The laser source 242 is configured to emit a laser beam in response to the adjustment signal. The display driver 232 is configured to send a second control signal to the laser source unit 240 (e.g., the DMD 270) based on the display signal. The laser source unit 240 is configured to modulate the laser beam emitted by the laser source 242 to obtain a projection beam for displaying the second prompt image A2 under the control of the second control signal.

The process of displaying the second prompt image A2 by the projection apparatus 200 is as follows. The first logic controller 231 receives the detection signal sent by the signal conversion circuit 212, and determines whether there is the object B to be protected in the laser projection region A based on the detection signal. The first logic controller 231 further sends the first notification signal to the display driver 232 and sends the third instruction signal to the multimedia main controller 122 based on the second instruction signal when it is determined that there is the object B to be protected in the laser projection region A. The third instruction signal is used to indicate that there is the object B to be protected in the laser projection region A.

The display driver 232 adjusts the projection parameter in response to the first notification signal, and sends the adjustment signal carrying the adjusted projection parameter to the laser source driving circuit 241. The laser source driving circuit 241 provides the driving signal to the laser source 242 based on the adjustment signal. The laser source 242 emits a laser beam under the driving of the driving signal.

The multimedia main controller 222 obtains the image information of the second prompt image A2 from the second memory 260 based on the third instruction signal, and sends the display signal to the display driver 232 of the laser source control unit 230. The display signal carries the image information of the second prompt image A2.

The display driver 232 sends a second control signal to the DMD 270 based on the display signal. Under the control of the second control signal, the DMD 270 modulates the laser beam emitted by the laser source 242 to obtain a projection beam for displaying the second prompt image A2. Control effect of the second control signal on the DMD 270 may be referred to control effect of the first control signal on the DMD 170 in the above embodiments, which will not be repeated herein.

Figure 9:
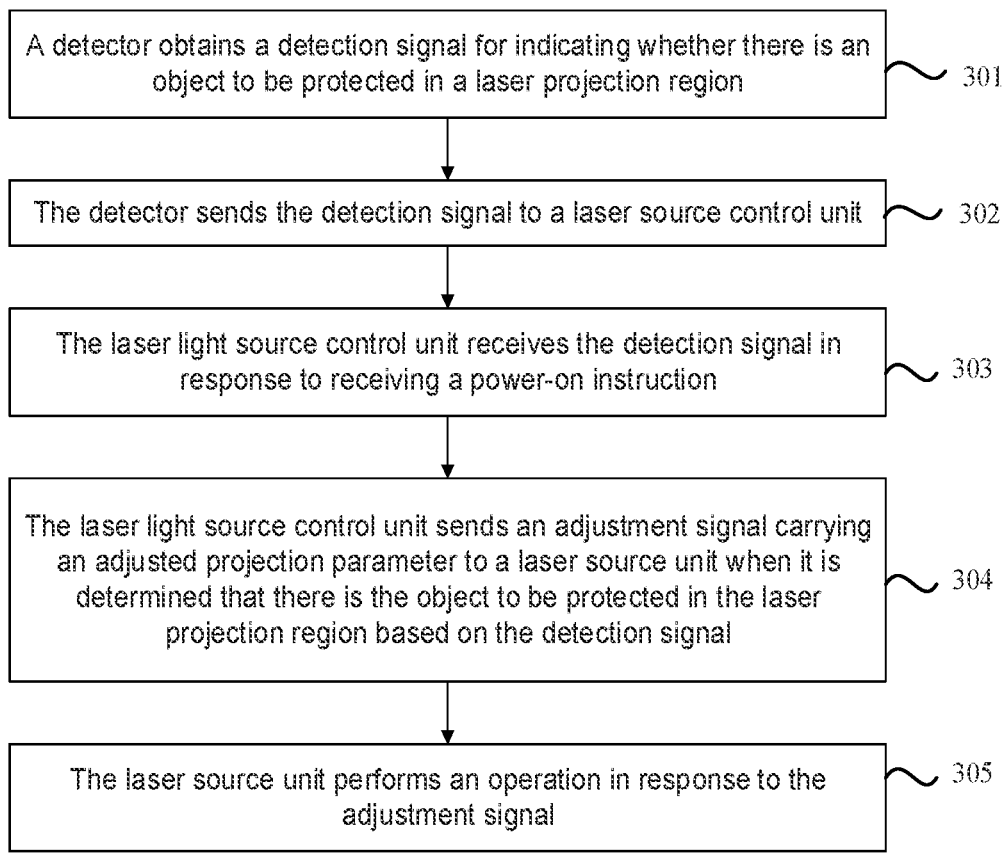
FIG. 9 is a flow diagram of a projection method, in accordance with some embodiments.

Some embodiments of the present disclosure provide a projection method. As shown in FIG. 9, the projection method includes step 301 to step 305.

In step 301, a detector 110 obtains a detection signal for indicating whether there is an object B to be protected in a laser projection region A.

In step 302, the detector 110 sends the detection signal to a laser source control unit 130.

In step 303, the laser source control unit 130 receives the detection signal.

In step 304, the laser source control unit 130 sends an adjustment signal carrying an adjusted projection parameter to a laser source unit 140 when determining that there is the object B to be protected in a laser projection region A of the laser source unit 140 based on the detection signal. The projection parameter is used to instruct to adjust a light emission luminance of at least one laser 1421 in the laser source unit 140.

In step 305, the laser source unit 140 performs an operation in response to the adjustment signal.

In the projection method provided by the embodiments of the present disclosure, before the multimedia board unit 120 is started up, the laser source control unit 130 can instruct the laser source unit 140 to perform operations based on the adjusted projection parameter, so that the projection apparatus 100 can achieve the human eye protection function after the power-on instruction is received. Thus, the practicability of the projection apparatus 100 is improved.

In some embodiments, the method further includes step 306 to step 308.

In step 306, the laser source control unit 130 starts timing when it is determined that there is the object B to be protected in the laser projection region A of the laser source unit 140 based on the detection signal.

In step 307, the laser source control unit 130 sends an adjustment signal carrying a shutdown instruction to the laser source unit 140 after a preset time and when it is determined that there is still the object B to be protected in the laser projection region A based on the detection signal.

In step 308, the laser source unit 140 performs a shutdown operation in response to the adjustment signal carrying the shutdown instruction.

Figure 10:
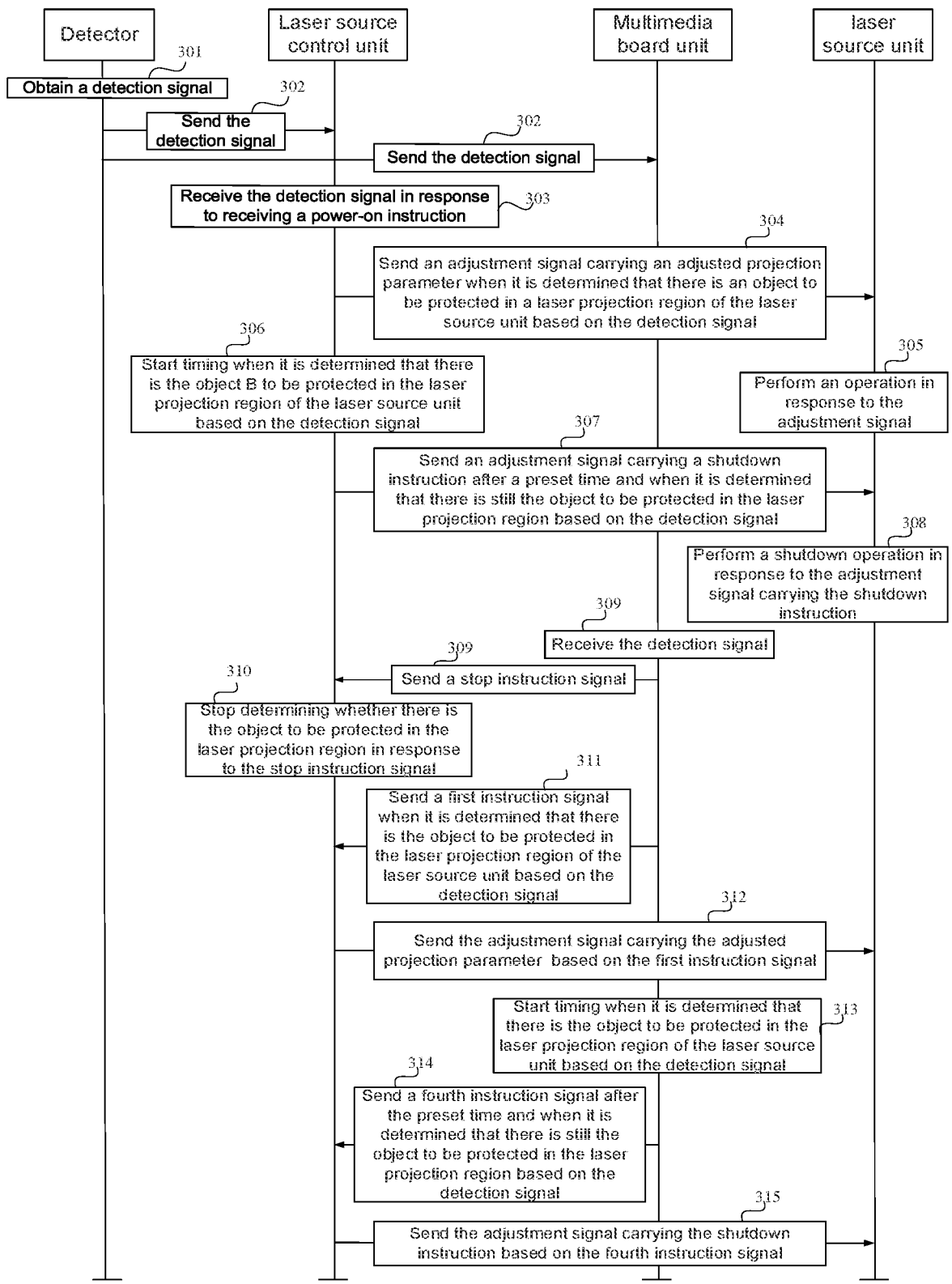
FIG. 10 is a flow diagram of a projection method, in accordance with some other embodiments.

In some embodiments, in step 302, the detector 110 also sends the detection signal to the multimedia board unit 120. Then, after step 302 and before step 305, as shown in FIG. 10, the projection method further includes step 309 to step 312.

In step 309, the multimedia board unit 120 sends a stop instruction signal to the laser source control unit 130, and receives the detection signal when the multimedia board unit 120 is started up.

In step 310, the laser source control unit 130 stops determining whether there is the object B to be protected in the laser projection region A in response to the stop instruction signal.

In step 311, the multimedia board unit 120 sends a first instruction signal to the laser source control unit 130 when it is determined that there is the object B to be protected in the laser projection region A of the laser source unit 140 based on the detection signal.

In step 312, the laser source control unit 130 sends the adjustment signal carrying the adjusted projection parameter to the laser source unit 140 based on the first instruction signal.

Step 305 is executed after step 312.

In some embodiments, the method further includes step 313 to step 315.

In step 313, the multimedia board unit 120 starts timing when it is determined that there is the object B to be protected in the laser projection region A of the laser source unit 140 based on the detection signal.

In step 314, the multimedia board unit 120 sends a fourth instruction signal to the laser source control unit 130 after the preset time and when it is determined that there is still the object B to be protected in the laser projection region A based on the detection signal.

In step 315, the laser source control unit 130 sends the adjustment signal carrying the shutdown instruction to the laser source unit 140 based on the fourth instruction signal.

Step 308 is executed after step 315.

Figure 11:
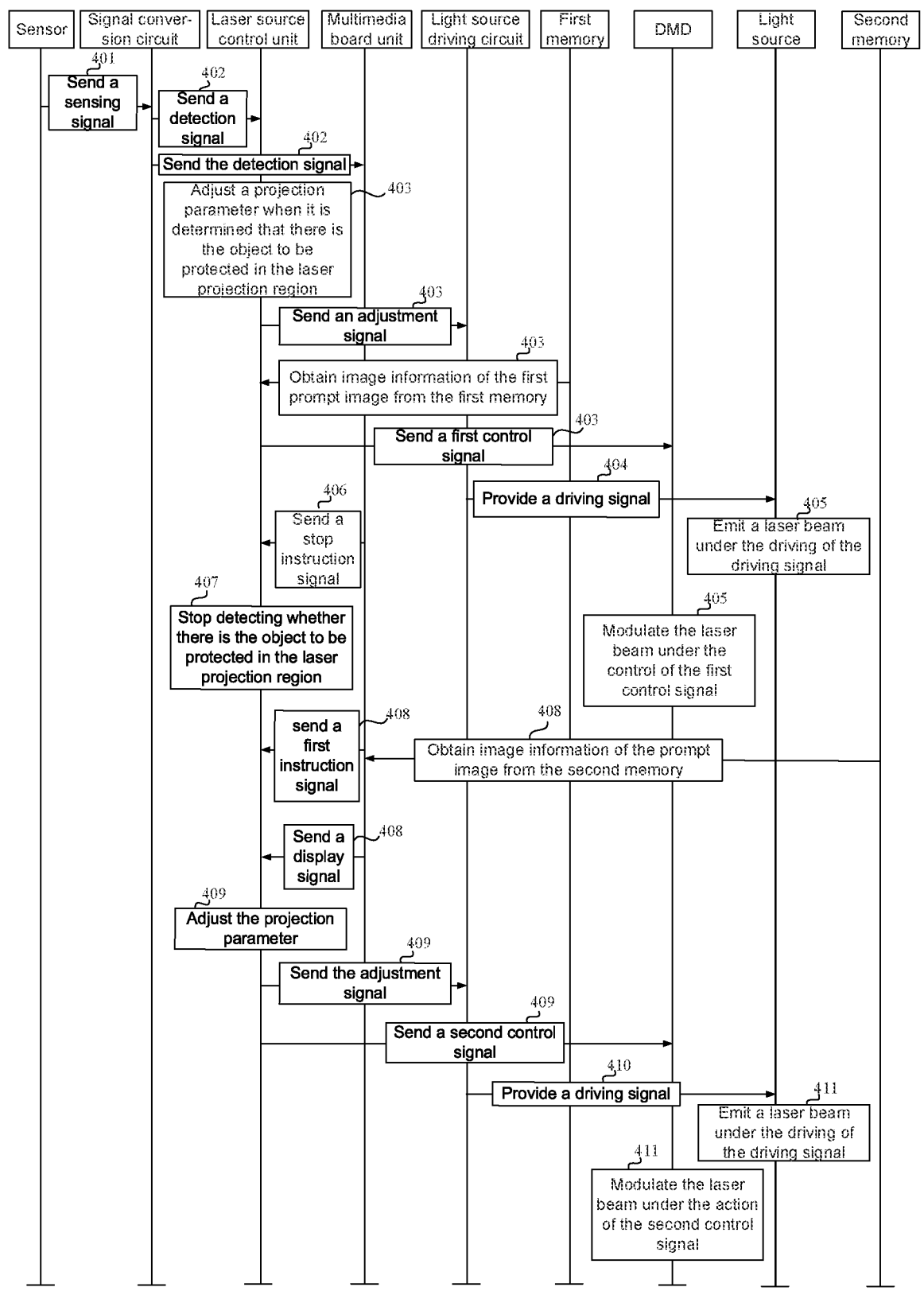
FIG. 11 is a flow diagram of a projection method, in accordance with yet some other embodiments.

In some embodiments, as shown in FIG. 11, the projection method further includes step 401 to step 411.

In step 401, a sensor 111 sends a sensing signal to a signal conversion circuit 112 based on an infrared signal.

For example, after collecting the infrared signal sent by the object B to be protected, the sensor 111 may convert the infrared signal into the sensing signal, and send the sensing signal to a signal conversion circuit 112.

In step 402, the signal conversion circuit 112 sends the detection signal to the laser source control unit 130 and the multimedia board unit 120 based on the sensing signal.

The detection signal is obtained by converting the sensing signal by the signal conversion circuit 112. For example, the signal conversion circuit 112 may sequentially perform amplification, comparison, and logic processing on the received sensing signal to obtain the detection signal.

In step 403, the laser source control unit 130 receives the detection signal, determines whether there is the object B to be protected in the laser projection region A based on the detection signal, and adjusts the projection parameter and sends the adjustment signal carrying the adjusted projection parameter to the laser source driving circuit 141 when it is determined that there is the object B to be protected in the laser projection region A; simultaneously, the laser source control unit 130 obtains image information of a first prompt image A1 from the first memory 150, and sends a first control signal to a DMD 170 based on the image information of the first prompt image A1. The projection parameter is used to instruct to adjust the light emission luminance of at least one laser in the laser source unit 140.

In step 404, the laser source driving circuit 141 provides the driving signal to a laser source 142 based on the adjustment signal.

In step 405, the laser source 142 emits a laser beam under driving of the driving signal, and the DMD 170 modulates the laser beam under control of the first control signal to obtain a projection beam for displaying the first prompt image A1.

In step 406, the multimedia board unit 120 sends the stop instruction signal to the laser source control unit 130 when the multimedia board unit 120 is started up. The stop instruction signal is used to instruct the laser source control unit 130 to stop detecting whether there is the object B to be protected in the laser projection region A.

In step 407, after receiving the stop instruction signal, the laser source control unit 130 stops detecting whether there is the object B to be protected in the laser projection region A.

In step 408, the multimedia board unit 120 receives the detection signal after the multimedia board unit 120 is started up, sends the first instruction signal to the laser source control unit 130 when it is determined that there is the object B to be protected in the laser projection region A based on the detection signal, and obtains image information of a second prompt image A2 from a second memory 160 and sends the display signal to the laser source control unit 130 based on the information of the second prompt image A2. The first instruction signal is used to indicate that there is the object B to be protected in the laser projection region A, and the display signal carries the image information of the second prompt image A2.

In step 409, the laser source control unit 130 adjusts the projection parameter based on the first instruction signal, sends the adjustment signal carrying the adjusted projection parameter to the laser source driving circuit 141, and sends a second control signal to the DMD 170 based on the display signal.

In step 410, the laser source driving circuit 141 provides the driving signal to a laser source 142 based on the adjustment signal.

In step 411, the laser source 142 emits the laser beam under driving of the driving signal, and the DMD 170 modulates the laser beam under an action of the second control signal to obtain a projection beam for displaying the second prompt image A2.

Those skilled in the art may clearly understand that, for the convenience and conciseness of the description, the principles and processes of the various steps of the projection method described above may be referred to the corresponding principles and processes in the above corresponding embodiments, which will not be repeated in the embodiments of the present disclosure.

Figure 12:
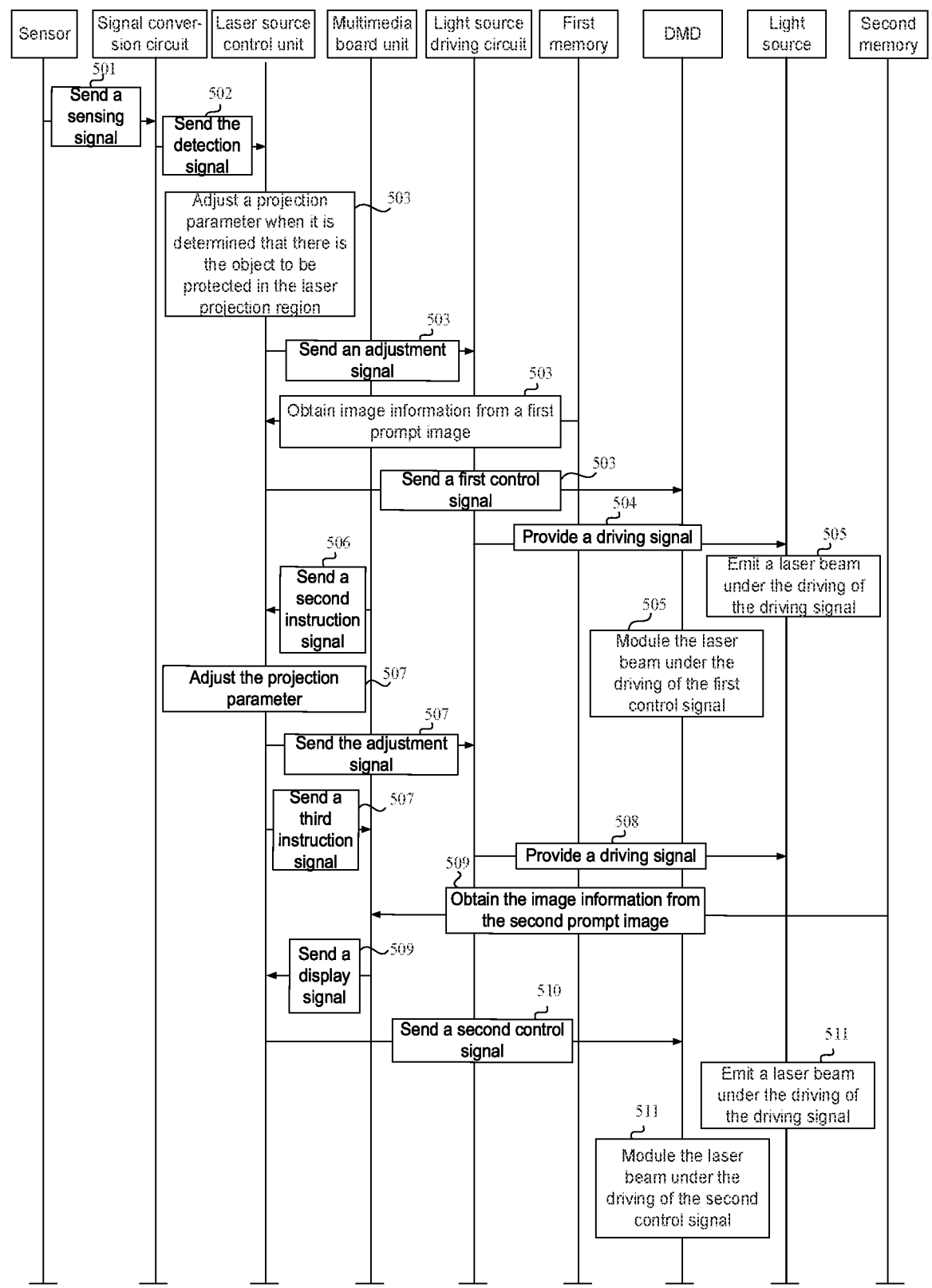
FIG. 12 is a flow diagram of a projection method, in accordance with yet some other embodiments.

Referring to FIG. 12, which is a flow diagram of a projection method in accordance with some other embodiments. The method may include step 501 to step 511.

In step 501, the sensor 211 sends the sensing signal to the signal conversion circuit 212 based on the received infrared signal.

In step 502, the signal conversion circuit 212 sends the detection signal to the laser source control unit 230 based on the sensing signal.

In step 503, after receiving the power-on instruction, the laser source control unit 230 receives the detection signal, and determines whether there is the object B to be protected in the laser projection region A of the laser source unit 240 based on the detection signal, and adjusts the projection parameter and sends the adjustment signal carrying the adjusted projection parameter to the laser source driving circuit 241 when it is determined that there is the object B to be protected in the laser projection region A; simultaneously, the laser source control unit 230 obtains the image information of the first prompt image A1 from the first memory 250, and sends the first control signal to the DMD 270 based on the image information of the first prompt image A1.

In step 504, the laser source driving circuit 241 provides the driving signal to the laser source 242 based on the adjustment signal.

In step 505, the laser source 242 emits the laser beam under the driving of the driving signal, and the DMD 270 modulates the laser beam under the control of the first control signal to obtain the projection beam for displaying the first prompt image A1.

In step 506, the multimedia board unit 220 sends a second instruction signal to the laser source control unit 230 after it is started up. The second instruction signal is used to indicate that the multimedia board unit 220 is started up.

In step 507, when it is determined that there is the object B to be protected in the laser projection region A, the laser source control unit 230 adjusts the projection parameter, sends the adjustment signal carrying the adjusted projection parameter to the laser source driving circuit 241, and sends a third instruction signal to the multimedia board unit 220 based on the second instruction signal. The third instruction signal is used to indicate that there is the object B to be protected in the laser projection region A.

In step 508, the laser source driving circuit 241 provides the driving signal to the laser source 242 based on the adjustment signal.

In step 509, the multimedia board unit 220 obtains the image information of the second prompt image A2 from a second memory 260 based on the third instruction signal, and sends the display signal to the laser source control unit 230 based on the image information of the second prompt image A2. The display signal carries the image information of the second prompt image A2.

In step 510, the laser source control unit 230 sends the second control signal to the DMD 270 based on the display signal.

In step 511, the laser source 242 emits the laser beam under the driving of the driving signal, and the DMD 270 modulates the laser beam under the control of the first control signal to obtain the projection beam for displaying the second prompt image A2.

Some embodiments of the present disclosure provide a computer-readable storage medium (e.g., a non-transitory computer-readable storage medium). The computer-readable storage medium stores computer program instructions that when executed by a projection apparatus, cause the projection apparatus to perform one or more steps in the projection method described in any one of the above embodiments. In one example, the computer program instructions, stored in the computer-readable storage medium, may be executed by corresponding elements of the projection apparatus including, but not limited to, the laser source control unit or the components thereof and the multimedia board unit or the components thereof, to cause the corresponding elements to perform the corresponding steps or operations described above with reference to such elements.

For example, the computer-readable storage medium may include, but is not limited to: a magnetic storage device (e.g., a hard disk, a floppy disk, or a magnetic tape), an optical disk (e.g., a compact disk (CD)), a digital versatile disk (DVD), a smart card and a flash memory device (e.g., an erasable programmable read-only memory (EPROM), a card, a stick or a key drive). The various computer-readable storage media described in the present disclosure may represent one or more devices and/or other machine-readable storage media for storing information. The term "machine-readable storage media" may include, but are not limited to, wireless channels and various other media capable of storing, containing, and/or carrying instruction(s) and/or data.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the scope of the present disclosure shall be subject to the protection scope of the claims.

What is claimed is:

1. A projection apparatus comprising a detector, a laser source control unit and a laser source unit, and the laser source control unit being connected to the detector and the laser source unit, wherein
the detector is configured to:
obtain a detection signal used to indicate whether there is an object to be protected in a laser projection region, and
send the detection signal;
the laser source control unit is configured to:
receive the detection signal; and
send an adjustment signal carrying an adjusted projection parameter to the laser source unit when it is determined that there is the object to be protected in the laser projection region of the laser source unit based on the detection signal, and the projection parameter being used to indicate a light emission luminance of at least one laser in the laser source unit;
the laser source unit is configured to emit a beam based on the adjustment signal;
the laser source control unit is also configured to send an adjustment signal carrying a shutdown instruction to the laser source unit after a preset time and when it is determined that there is still the object to be protected in the laser projection region of the laser source unit based on the detection signal;
the laser source unit is also configured to perform a shutdown operation in response to the adjustment signal carrying the shutdown instruction;
the laser source control unit is also configured to send an adjustment signal carrying an unadjusted projection parameter to the laser source unit after the preset time and when it is determined that there is no object to be protected in the laser projection region of the laser source unit based on the detection signal; and
the laser source unit is further configured to emit a beam in response to the adjustment signal carrying the unadjusted projection parameter.

2. The projection apparatus according to claim 1, further comprising:
a first memory configured to store image information of a first prompt image, wherein
the laser source control unit is further configured to obtain the image information of the first prompt image from the first memory when it is determined that there is the object to be protected in the laser projection region, and send a first control signal to the laser source unit based on the image information of the first prompt image; and
the laser source unit is further configured to modulate the beam to obtain a projection beam for displaying the first prompt image in response to the first control signal.

3. The projection apparatus according to claim 1, further comprising:
a multimedia board unit connected to the detector and the laser source control unit, and configured to:
receive the detection signal and send a stop instruction signal to the laser source control unit when the multimedia board unit is started up, so that the laser source control unit stops determining whether there is the object to be protected in the laser projection region based on the stop instruction signal; and
send a first instruction signal to the laser source control unit when it is determined that there is the object to be protected in the laser projection region based on the detection signal, and the first instruction signal being used to indicate that there is the object to be protected in the laser projection region, wherein the laser source control unit is further configured to send the adjustment signal to the laser source unit based on the first instruction signal.

4. The projection apparatus according to claim 3, further comprising:

a second memory configured to store image information of a second prompt image, wherein the multimedia board unit is further configured to obtain image information of the second prompt image from the second memory when it is determined that there is the object to be protected in the laser projection region, and send a display signal to the laser source control unit, and the display signal carries the image information of the second prompt image;

the laser source control unit is further configured to send a second control signal to the laser source unit based on the display signal; and the laser source unit is further configured to modulate the beam to obtain a projection beam for displaying the second prompt image in response to the second control signal.

5. The projection apparatus according to claim 3, wherein the multimedia board unit includes a second logic controller connected to the detector and a multimedia main controller connected to the laser source control unit and the second logic controller;

the multimedia main controller is configured to send the stop instruction signal to the laser source control unit when the multimedia main controller is started up;

the second logic controller is configured to receive the detection signal, and send a second notification signal to the multimedia main controller when it is determined that there is the object to be protected in the laser projection region based on the detection signal, and the second notification signal is used to indicate that there is the object to be protected in the laser projection region; and the multimedia main controller is also configured to send the first instruction signal to the laser source control unit in response to the second notification signal.

6. The projection apparatus according to claim 3, wherein the multimedia board unit is further configured to send a fourth instruction signal to the laser source control unit after a preset time and when it is determined that there is still the object to be protected in the laser projection region of the laser source unit based on the detection signal;

the laser source control unit is further configured to send the adjustment signal carrying the shutdown instruction to the laser source unit based on the fourth instruction signal;

the laser source unit is further configured to perform a shutdown operation in response to the adjustment signal carrying the shutdown instruction;

the multimedia board unit is further configured to send a fifth instruction signal to the laser source control unit after the preset time and when it is determined that there is no object to be protected in the laser projection region of the laser source unit based on the detection signal;

the laser source control unit is further configured to send an adjustment signal carrying an unadjusted projection parameter to the laser source unit based on the fifth instruction signal; and the laser source unit is configured to emit a laser beam in response to the adjustment signal carrying the unadjusted projection parameter.

7. The projection apparatus according to claim 1, further comprising:

a multimedia board unit connected to the laser source control unit; and a second memory configured to store image information of a second prompt image, wherein the multimedia board unit is configured to send a second instruction signal to the laser source control unit when the multimedia board unit is started up, and the second instruction signal is used to indicate that the multimedia board unit is started up;

the laser source control unit is also configured to send a third instruction signal to the multimedia board unit based on the second instruction signal when it is determined that there is the object to be protected in the laser projection region, and the third instruction signal is used to indicate that there is the object to be protected in the laser projection region;

the multimedia board unit is further configured to obtain image information of a second prompt image from the second memory based on the third instruction signal, and send a display signal to the laser source control unit, and the display signal carries the image information of the second prompt image;

the laser source control unit is configured to send a second control signal to the laser source unit based on the display signal; and the laser source unit is further configured to modulate the beam emitted by the laser source unit in response to the second control signal to obtain a projection beam for displaying the second prompt image.

8. The projection apparatus according to claim 7, wherein the multimedia board unit includes a multimedia main controller, and the multimedia main controller is connected to the laser source control unit; wherein the multimedia main controller is configured to send the second instruction signal to the laser source control unit when it is started up, and the second instruction signal is used to indicate that the multimedia main controller is started up.

9. The projection apparatus according to claim 1, wherein the detector includes a sensor and a signal conversion circuit, and the signal conversion circuit is connected to the sensor and the laser source control unit;

the sensor is configured to collect an infrared signal emitted by the object to be protected, and send a sensing signal to the signal conversion circuit based on the collected infrared signal; and the signal conversion circuit is configured to send the detection signal to the laser source control unit based on the sensing signal.

10. The projection apparatus according to claim 1, wherein the laser source control unit includes a first logic controller and a display driver, and the first logic controller is connected to the detector and the display driver, and the display driver is also connected to the laser source unit;

the first logic controller is configured to receive the detection signal, and send a first notification signal to the display driver when it is determined that there is the object to be protected in the laser projection region based on the detection signal; and the display driver is configured to send the adjustment signal carrying the adjusted projection parameter to the laser source unit based on the first notification signal.

11. The projection apparatus according to claim 10, wherein the first logic controller is configured to:
receive the detection signal;
count a number of pulses of the detection signal per unit time;
compare the number of the pulses with a reference threshold;
determine that there is the object to be protected in the laser projection region in a case where the number of the pulses is greater than or equal to the reference threshold; and
send the first notification signal to the display driver.

12. The projection apparatus according to claim 1, wherein the laser source unit includes a laser source driving circuit and a laser source, and the laser source driving circuit is connected to the laser source control unit and the laser source;
the laser source driving circuit is configured to receive the adjustment signal, and provide a driving signal to the laser source based on the adjustment signal; and
the laser source is configured to emit a beam under driving of the driving signal.

13. A projection method, comprising:
obtaining, by a detector, a detection signal used to indicate whether there is an object to be protected in a laser projection region;
sending, by the detector, the detection signal to a laser source control unit;
receiving, by the laser source control unit, the detection signal;
sending, by the laser source control unit, an adjustment signal carrying an adjusted projection parameter to a laser source unit when it is determined that there is the object to be protected in the laser projection region, and the projection parameter being used to indicate a light emission luminance of at least one laser in the laser source unit;
emitting, by the laser source unit, a beam in response to the adjustment signal;
starting timing, by the laser source control unit, when it is determined that there is the object to be protected in the laser projection region of the laser source unit based on the detection signal;
sending, by the laser source control unit, an adjustment signal carrying a shutdown instruction to the laser source unit after a preset time, and when it is determined that there is still the object to be protected in the laser projection region of the laser source unit based on the detection signal;
performing, by the laser source unit, a shutdown operation in response to the adjustment signal carrying the shutdown instruction;
sending, by the laser source control unit, an adjustment signal carrying an unadjusted projection parameter to the laser source unit after the preset time, and when it is determined that there is no object to be protected in the laser projection region of the laser source unit based on the detection signal; and
emitting, by the laser source unit, a beam in response to the adjustment signal carrying the unadjusted projection parameter.

14. The projection method according to claim 13, further comprising:
obtaining, by the laser source control unit, image information of a first prompt image from a first memory when it is determined that there is the object to be protected in the laser projection region;
sending, by the laser source control unit, a first control signal to the laser source unit based on the image information of the first prompt image; and
modulating, by the laser source unit, the beam in response to the first control signal to obtain a projection beam for displaying the first prompt image.

15. The projection method according to claim 13, wherein the detector further sends a detection signal to a multimedia board unit, and the method further comprises:
sending, by the multimedia board unit, a stop instruction signal to the laser source control unit when the multimedia board unit is started up; and receiving, by the multimedia board unit, the detection signal when the multimedia board unit is started up;
stopping determining, by the laser source control unit, whether there is the object to be protected in the laser projection region in response to the stop instruction signal;
sending, by the multimedia board unit, a first instruction signal to the laser source control unit when it is determined that there is the object to be protected in the laser projection region based on the detection signal, and the first instruction signal being used to indicate that there is the object to be protected in the laser projection region; and
sending, by the laser source control unit, the adjustment signal to the laser source unit based on the first instruction signal.

16. The projection method according to claim 15, further comprising:
obtaining, by the multimedia board unit, image information of a second prompt image from a second memory when it is determined that there is the object to be protected in the laser projection region;
sending, by the multimedia board unit, a display signal to the laser source control unit, and the display signal carrying the image information of the second prompt image;
sending, by the laser source control unit, a second control signal to the laser source unit based on the display signal; and
modulating, by the laser source unit, the beam in response to the second control signal to obtain a projection beam for displaying the second prompt image.

17. The projection method according to claim 13, further comprising:
sending, by the multimedia board unit, a second instruction signal to the laser source control unit when the multimedia board unit is started up, and the second instruction signal being used to indicate that the multimedia board unit is started up;
sending, by the laser source control unit, a third instruction signal to the multimedia board unit based on the second instruction signal when it is determined that there is the object to be protected in the laser projection region, and the third instruction signal being used to indicate that there is the object to be protected in the laser projection region;
obtaining, by the multimedia board unit, image information of a second prompt image from a second memory based on the third instruction signal;
sending, by the multimedia board unit, a display signal to the laser source control unit, and the display signal carrying the image information of the second prompt image;

sending, by the laser source control unit, a second control signal to the laser source unit based on the display signal; and modulating, by the laser source unit, the beam emitted by the laser source unit in response to the second control signal to obtain a projection beam for displaying the second prompt image.

18. A non-transitory computer-readable storage medium storing computer program instructions that when executed by a projection apparatus, cause the projection apparatus to:

obtain a detection signal used to indicate whether there is an object to be protected in a laser projection region;

send an adjustment signal carrying an adjusted projection parameter to a laser source unit when it is determined that there is the object to be protected in the laser projection region based on the detection signal, so that the laser source unit emits a beam in response to the adjustment signal, and the projection parameter being used to indicate a light emission luminance of at least one laser in the laser source unit;

start timing when it is determined that there is the object to be protected in the laser projection region of the laser source unit based on the detection signal;

send an adjustment signal carrying a shutdown instruction to the laser source unit after a preset time, and when it is determined that there is still the object to be protected in the laser projection region of the laser source unit based on the detection signal, so that the laser source unit performs a shutdown operation in response to the adjustment signal carrying the shutdown instruction; and send an adjustment signal carrying an unadjusted projection parameter to the laser source unit after the preset time, and when it is determined that there is no object to be protected in the laser projection region of the laser source unit based on the detection signal, so that the laser source unit emits a beam in response to the adjustment signal carrying the unadjusted projection parameter.

* * * * *